United States Patent [19]
Shima et al.

[11] Patent Number: 5,555,312
[45] Date of Patent: Sep. 10, 1996

[54] AUTOMOBILE APPARATUS FOR ROAD LANE AND VEHICLE AHEAD DETECTION AND RANGING

[75] Inventors: Nobukazu Shima, Kobe; Hiroshi Kamada, Kawasaki, both of Japan

[73] Assignee: Fujitsu Limited, Kanagawa, Japan

[21] Appl. No.: 234,676

[22] Filed: Apr. 28, 1994

[30] Foreign Application Priority Data

Jun. 25, 1993 [JP] Japan ................................. 5-155138

[51] Int. Cl.$^6$ ............................................. G06K 9/00
[52] U.S. Cl. .................... 382/104; 382/291; 340/937; 364/461
[58] Field of Search ........................ 382/1, 22, 48, 382/104, 199, 291, 106; 364/424.02, 436, 460, 461; 340/903, 933, 937; 348/118, 119, 140, 148

[56] References Cited

U.S. PATENT DOCUMENTS

| | | | |
|---|---|---|---|
| 4,931,937 | 6/1990 | Kakinami et al. | 364/424.02 |
| 4,942,533 | 7/1990 | Kakinami et al. | 364/449 |
| 4,970,653 | 11/1990 | Kenue | 364/461 |
| 5,301,115 | 4/1994 | Nouso | 364/460 |
| 5,307,419 | 4/1994 | Tsujino et al. | 382/1 |
| 5,309,137 | 5/1994 | Kajiwara | 340/436 |
| 5,341,437 | 8/1994 | Nakayama | 382/1 |

FOREIGN PATENT DOCUMENTS

| | | | |
|---|---|---|---|
| 0361914 | 4/1990 | European Pat. Off. | 364/424.02 |
| 2240443 | 7/1991 | United Kingdom | 340/933 |

OTHER PUBLICATIONS

Beucher et al., "Traffic Spatial Measurements Using Video Image Processing," *Intelligent Robots and Computer Vision: Sixth in a Series*, SPIE vol. 848, 1987, pp. 648–655.

Primary Examiner—Leo Boudreau
Assistant Examiner—Andrew W. Johns

[57] ABSTRACT

An apparatus recognizes road traffic lines and a car running ahead without regard to obstacles and noise signals. A video image recording unit on a car provides an image of the road ahead. Horizontal edges in the image are detected for determining the presence of a car ahead. Successive lateral sweeps in both directions from a center line that advance at predetermined sampling intervals from a proximal portion of the image toward a distal portion of the image provide data by which horizontal edges are determined for comparison against predetermined standards. A base line on the road for the car ahead is determined as the most proximal horizontal edge. Lines marking road lanes are detected by similar two directional search lines from a center line. Lane lines are identified in right and left proximal portions of the image and extrapolated to the distal portion of the image. Missing portions of lines are interpolated. In determining the presence of marked road lanes, vertical edge detection provides basic data for establishing the thickness and distance between probable lines for comparison against predetermined standards. Comparison of successive road images determines relative motion between the vehicle bearing the apparatus and detected images and aids in updating the image and eliminating noise signals.

28 Claims, 27 Drawing Sheets

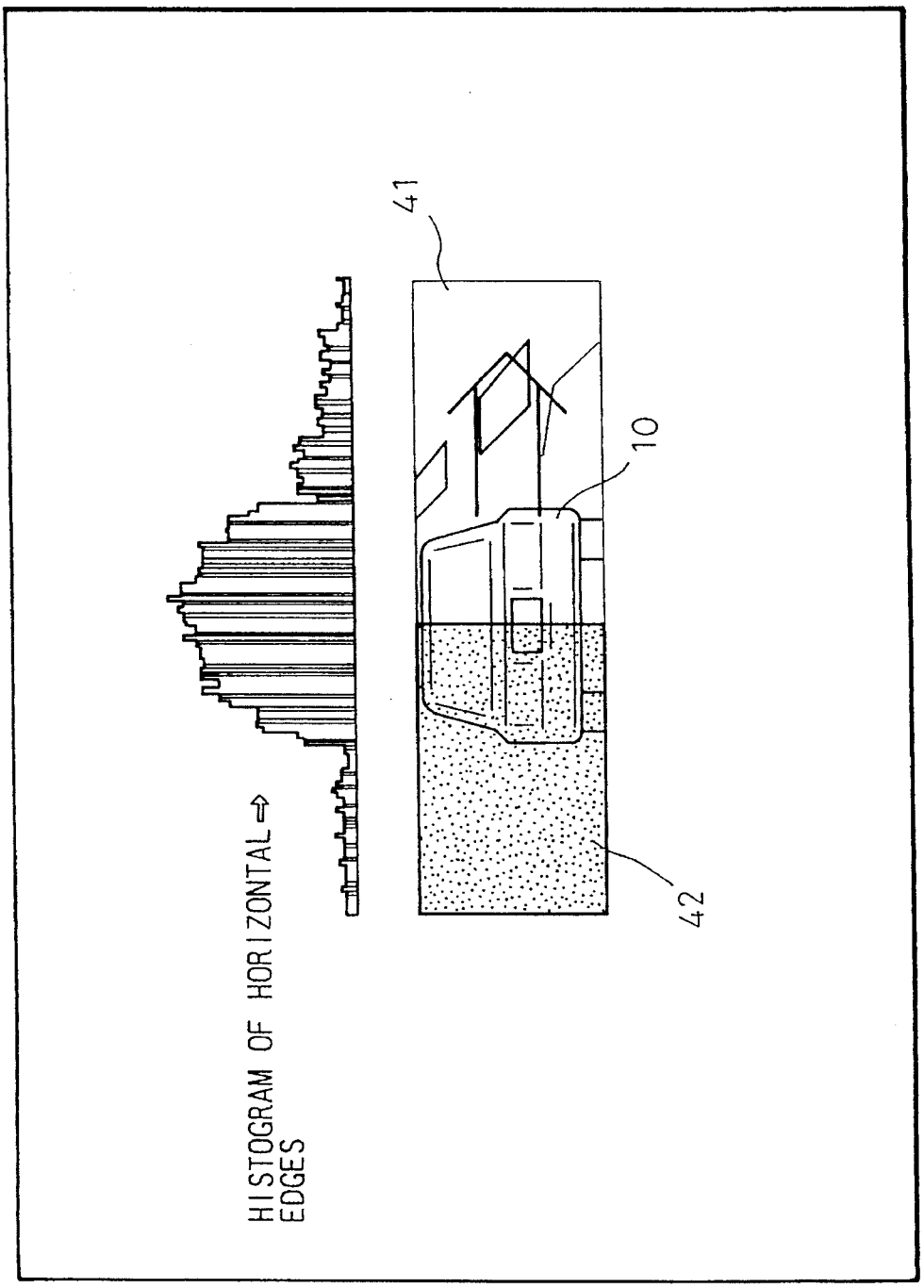

Fig.6(a)  Fig.6(b)

| 1 | 0 | -1 |
|---|---|----|
| 2 | 0 | -2 |
| 1 | 0 | -1 |

$\Delta x\ f$

| 1 | 2 | 1 |
|---|---|---|
| 0 | 0 | 0 |
| -1 | -2 | -1 |

$\Delta y\ f$

AUTOMOBILE APPARATUS FOR ROAD LANE AND VEHICLE AHEAD DETECTION AND RANGING

BACKGROUND OF THE INVENTION

1. Field of the Invention

The present invention relates to an apparatus having an image processing system for recognizing road environment, and particularly, to an apparatus employing an image recording unit such as a television camera mounted on a car, for recognizing traffic lines such as white lines painted on a road and a car running ahead.

2. Description of the Related Art

Although car technology is improving, traffic accidents are increasing. Many traffic accidents are caused due to human errors in judging situations. It is desired to develop apparatuses for assisting human vision.

Driver assisting apparatuses employing image record units such as television cameras recognize road conditions and a car running ahead.

When driving a car, a driver must follow white or yellow traffic lines painted on a road and must be careful about the movement of a car running ahead.

The traffic lines are important to control traffic and guide cars. Drivers must follow the traffic lines.

An apparatus for recognizing the traffic lines alerts a driver if the car runs out of a lane and controls the car according to the recognized information. This will reduce the load on the driver and prevent traffic accidents.

Drivers must be careful about the movement of a car running ahead. An apparatus for recognizing the car ahead alerts the driver if the driver's car runs out of a lane, or if the car ahead comes dangerously closer to the driver's car and controls the car to follow the car ahead. This will reduce the load on the driver and prevent traffic accidents.

FIG. 26 shows an apparatus for recognizing road environment according to a prior art.

This apparatus has an image recording unit, i.e., a television camera 1 for picking up a road image, an edge image extraction unit 2 for providing an edge image showing contours of objects according to the road image, a unit 3 for extracting edges of traffic lines 6 according to the edge image, and a unit 4 for calculating the position of each traffic line according to the edges.

Referring to FIGS. 27 and 28, pixels in the road image 5 are scanned from the center of the image 5 in left and right directions as indicated with arrow marks, to find contours 7 and 8 of each traffic line 6. Each position where a scan line intersects the contours 7 and 8 is defined as a traffic line position 9.

If the road image 5 includes a car running ahead or if the traffic line 6 is discontinuous as shown in FIG. 28, the prior art is usually unable to recognize the traffic line 6.

Due to the car 10 running ahead, the prior art is unable to detect the contours 7 and 8 of the traffic line 6 and mistakes a contour 11 of the car 10 for the traffic line 6.

If the traffic line 6 is discontinuous, the prior art will not find the traffic line 6 at discontinuous parts thereof. If the road image 5 involves a shadow 12 of a building or a tree as shown in FIG. 30, the prior art will mistake the shadow 12 for the edges of the traffic line 6.

In actual road environment, the road image 5 always involves obstacles and noise, so that it is very difficult for the prior art to recognize the traffic lines 6.

FIG. 29 is a block diagram showing an apparatus for recognizing a car running ahead according to a prior art.

This apparatus has an image recording unit, i.e., a television camera 1 for picking up a road image, an edge image extraction unit 2 for providing an edge image showing edges of objects according to the road image, a car search unit 20 for two-dimensionally searching for a longest horizontal edge 13 according to the edge image and finding a rectangle according to the edge 13, and a unit 21 for calculating a distance to the car ahead according to a distance table and the center position of the rectangle on the edge image.

If there is a long horizontal shadow 12 on the road as shown in FIG. 30, the prior art will mistake the shadow 12 for a horizontal edge of the car ahead.

If an edge is disconnected due to noise in the road image, the prior art will fail to recognize the car ahead. In an actual road environment, the road image unavoidably contains noise such as the shadow 12, and therefore, the prior art may not recognize the car running ahead.

To recognize the car ahead, the prior art two-dimensionally searches the whole of the road image for a most probable edge. This takes a long time. The prior art is incapable of determining whether or not the recognized car is running in the same lane where the car itself is running.

SUMMARY OF THE INVENTION

An object of the present invention is to provide an apparatus for providing an image of a road with an image recording unit such as a television camera mounted on a car, and easily and surely recognizing traffic lines painted on the road irrespective of obstacles and noise. The apparatus also easily and surely recognizes the position of a car running ahead irrespective of noise such as shadows that may cause a problem in the prior art.

Basic arrangements of the present invention to achieve the object will be explained.

According to a first aspect of the present invention, an apparatus for recognizing road environment obtains a road image with an image recording unit mounted on a car, prepares an edge image showing contours of objects according to the road image, moves a search line from a proximal end toward a distal end in a predetermined range in the edge image, to detect horizontal edges in the edge image, and determines a base line of a car running ahead according to an arrangement of the detected horizontal edges. According to a second aspect of the present invention, an apparatus for recognizing road environment obtains a road image with an image recording unit mounted on a car, prepares an edge image showing contours of objects according to the road image, halves a proximal part of the edge image into a left first area A and a right second area B, defines a distal part of the edge image as a third area C, leftwardly searches the first area A for probable points to determine a traffic line, rightwardly searches the second area B for probable points to determine a traffic line, and extends the traffic lines determined in the first and second areas A and B into the third area C, to completely determine the traffic lines.

According to a third aspect of the present invention, an apparatus for recognizing road environment carries out a smoothing process to add an afterimage to a road image provided by an image recording unit and prepares an edge image showing contours of objects according to the road image with the afterimage.

According to a fourth aspect of the present invention, an apparatus for recognizing road environment is realized by a suitable combination of the first to third aspects.

The apparatus for recognizing road environment according to the present invention employs one of these basic technical arrangements. The first aspect of the present invention finds a horizontal base edge of a car running ahead, to recognize the car. The first aspect moves a search line from a proximal end toward a distal end in a predetermined search area in a screen, to find the base line of the car ahead. Since the search area is limited, the first aspect quickly recognizes the car.

When determining the base line of the car ahead, the apparatus according to the present invention finds a plurality of horizontal edges that meet predetermined conditions. This results in preventing erroneous recognition due to noise such as shadows.

The present invention firstly recognizes traffic lines painted on a road, to determine a lane where the car itself is running. Within the lane, the present invention searches for a car running ahead. This eliminates noise outside the lane. The present invention processes a predetermined area in a road image, to easily find a positional relationship between the car, which mounts the present invention, and the car ahead.

The second aspect of the present invention obtains an image of a road adjacent to the car itself. In the image, a plurality of probable points to determine traffic lines are longitudinally plotted. The second aspect divides the image into three areas. Namely, the second aspect halves a proximal part of the image into a left first area A and a right second area B and defines a distal part of the image as a third area C. The first area A is leftwardly searched for probable points to determine a traffic line. The second area B is rightwardly searched for probable points to determine a traffic line. The traffic lines determined in the first and second areas A and B are extended into the third area C, to complete the traffic lines. In this way, the second aspect easily and surely recognizes traffic lines painted on a road.

The second aspect of the present invention firstly determines traffic lines in the first and second areas A and B. This is because the proximal part of an image includes a larger number of pixels in the width of a traffic line and better edges than the distal part of the image. In addition, the proximal part includes a smaller number of obstacles such as a car running ahead than the distal part. The first and second areas A and B may be defined more widely to include a larger number of probable points to determine traffic lines. This removes erroneous probable points due to contours of the car ahead and correctly recognizes the traffic lines.

If there are discontinuous traffic lines, the first and second areas A and B may be extended longer than an interval between the traffic line segments, to correctly determine the traffic lines.

The traffic lines determined in the first and second areas A and B are extended into the third area C, to completely determine the traffic lines. This is because the distal part frequently involves obstacles such as a car running ahead or curved traffic lines. It is difficult, therefore, to recognize traffic lines in the distal part by scanning the image from the center thereof toward left and right sides.

According to the third aspect of the present invention, the image recording unit, i.e., the television camera picks up an image of a road. The image is smoothed to remove noise such as shadows, and disconnected parts of traffic lines are interpolated, to provide a smoothed image. The smoothed image clearly shows objects such as a car running ahead at slow relative speed or objects such as traffic lines that are stopped in the image. The smoothed image erases other objects such as trees, buildings, and shadows thereof that move at a high relative speed. According to the smoothed image, an edge image showing contours of objects is prepared, and according to the edge image, the car running ahead and traffic lines are recognized according to the first and second aspects of the present invention. Unlike the prior art, the present invention never mistakes the shadows and noise for the car ahead and traffic lines.

The smoothing process according to the present invention provides a first image, i.e., a smoothed image and a second image, i.e., an input image, compares the first and second images with each other, and leaves the smoothed image as it is if a difference between pixel values at the same coordinate position in the first and second images is within a preset range. If the difference is out of the preset range, the pixel value of the smoothed image is brought closer to the pixel value of the input image by a preset value, to provide an output image. The output image is used as a new smoothed image. These processes are repeated to complete the smoothed image.

The smoothed image clearly shows a part where a pixel difference between the smoothed and input images is small, while it blurs and erases a part where the pixel difference is large. Namely, a part that slowly moves or is stopped on the image is clearly extracted, and a part that quickly moves on the image is blurred and erased.

Accordingly, shadows of surrounding objects having a large relative speed are erased from the smoothed image.

Although the traffic lines have a large relative speed similar to the shadows, the traffic lines are substantially stopped in the image, so that they are extractable. Even if the traffic lines are discontinuous, they continuously flow at the same position in the image, so that they are interpolated and extracted as continuous lines in the smoothed image.

The car running ahead has a small relative speed, so that it moves slowly in the image, and therefore, is extractable.

As explained above, the smoothing process removes noise such as shadows from an image, to easily recognize traffic lines and a car running ahead.

BRIEF DESCRIPTION OF THE DRAWINGS

FIG. 5 explains a process carried out by a unit for determining the position of a car running ahead in the apparatus of the present invention.

FIGS. 6(a) and 6(b) show SOBEL operators used for an edge detection spatial filter in the apparatus of the present invention.

DESCRIPTION OF THE PREFERRED EMBODIMENTS

Apparatuses for recognizing road environment according to embodiments of the present invention will be explained in detail with reference to drawings.

Figure 1:
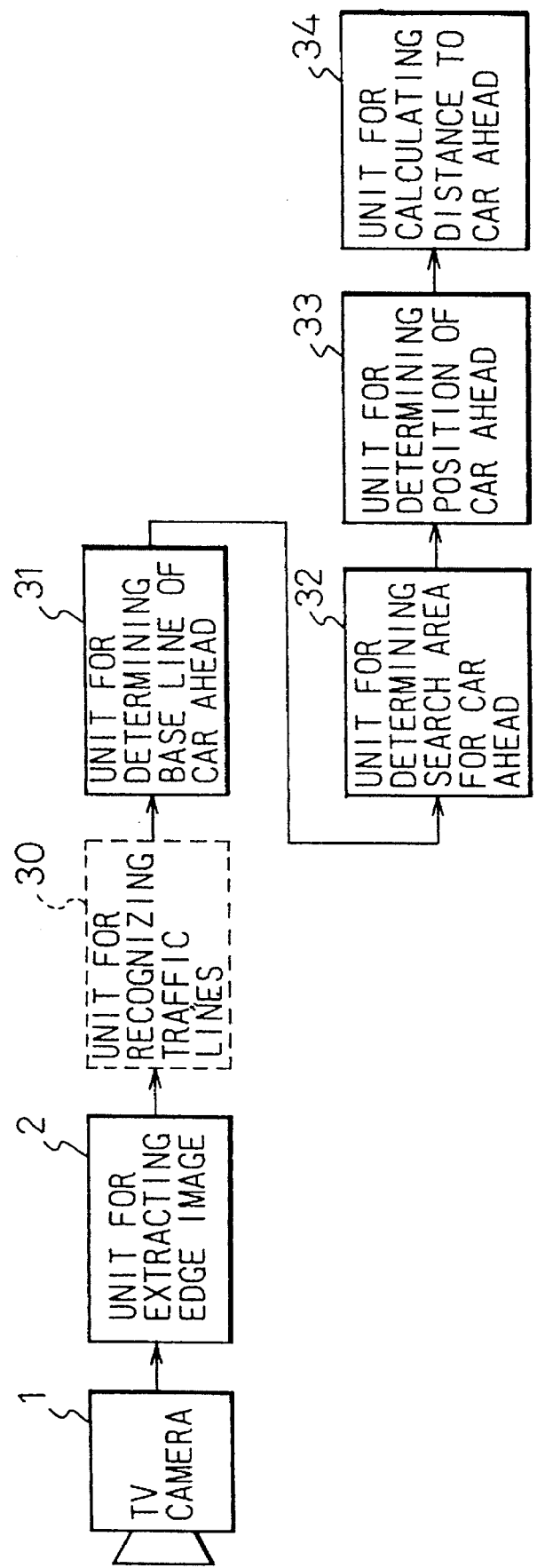
FIG. 1 is a block diagram showing a system for recognizing a car running ahead in an apparatus for recognizing road environment according to the first aspect of the present invention.

FIG. 1 is a block diagram showing an apparatus for recognizing road environment according to the first aspect of the present invention. The apparatus includes an image recording unit mounted on a car to provide an image 5 of a road; a unit 2 for preparing an edge image showing contours of objects according to the road image 5; a base line decision unit 31 for moving a search line in an optional area in the edge image, to determine a base line of a car running ahead; a search area decision unit 32 for setting an area of predetermined size according to the base line; a unit 33 for determining the position of the car ahead; and a unit 34 for calculating a distance to the car ahead. It is preferable to arrange, in front of the base line decision unit 31, a unit 30 for recognizing traffic lines 6 painted on the road.

Figure 2:
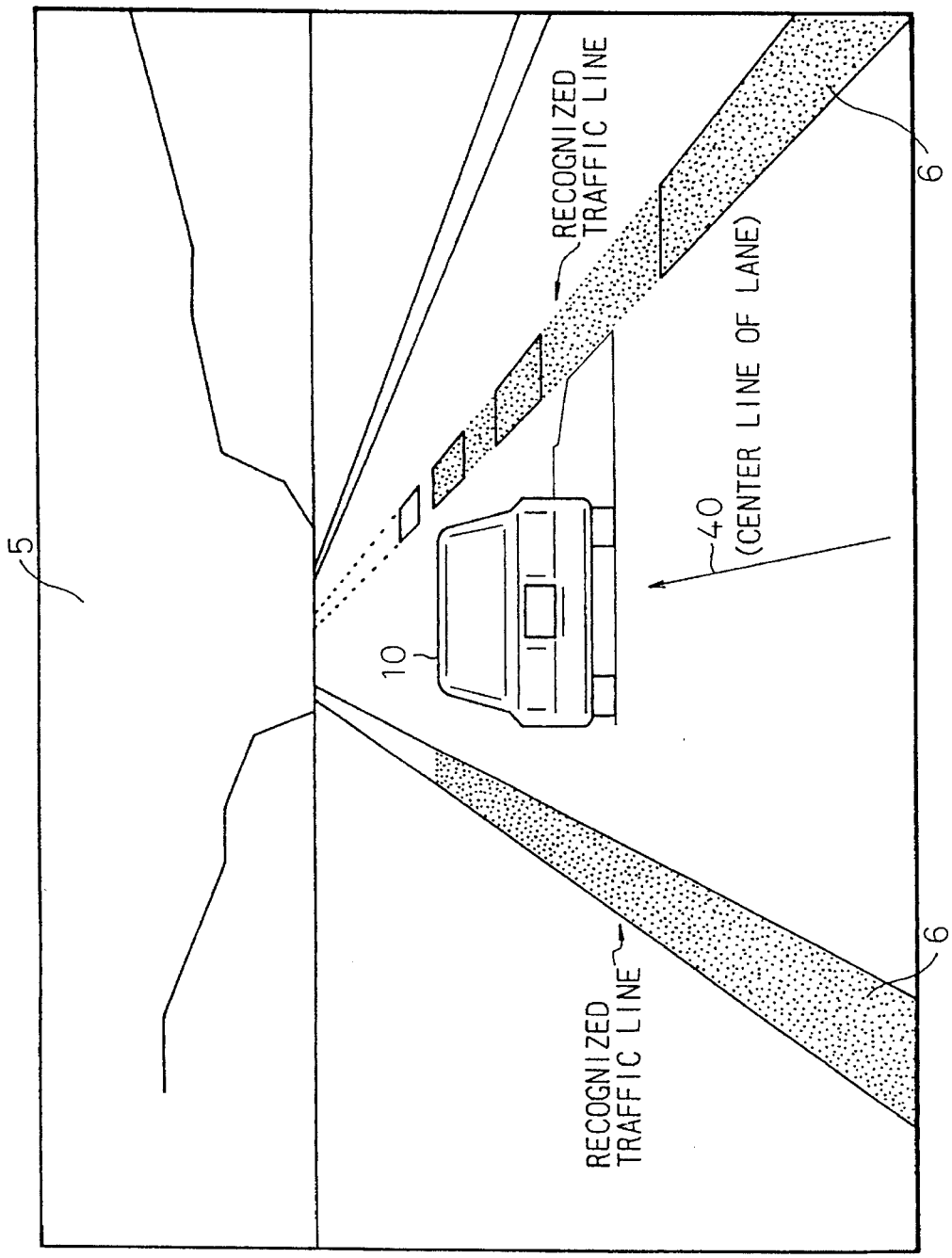
FIG. 2 explains a result of a process carried out by a traffic line recognition unit in the apparatus of the present invention.
Figure 3:
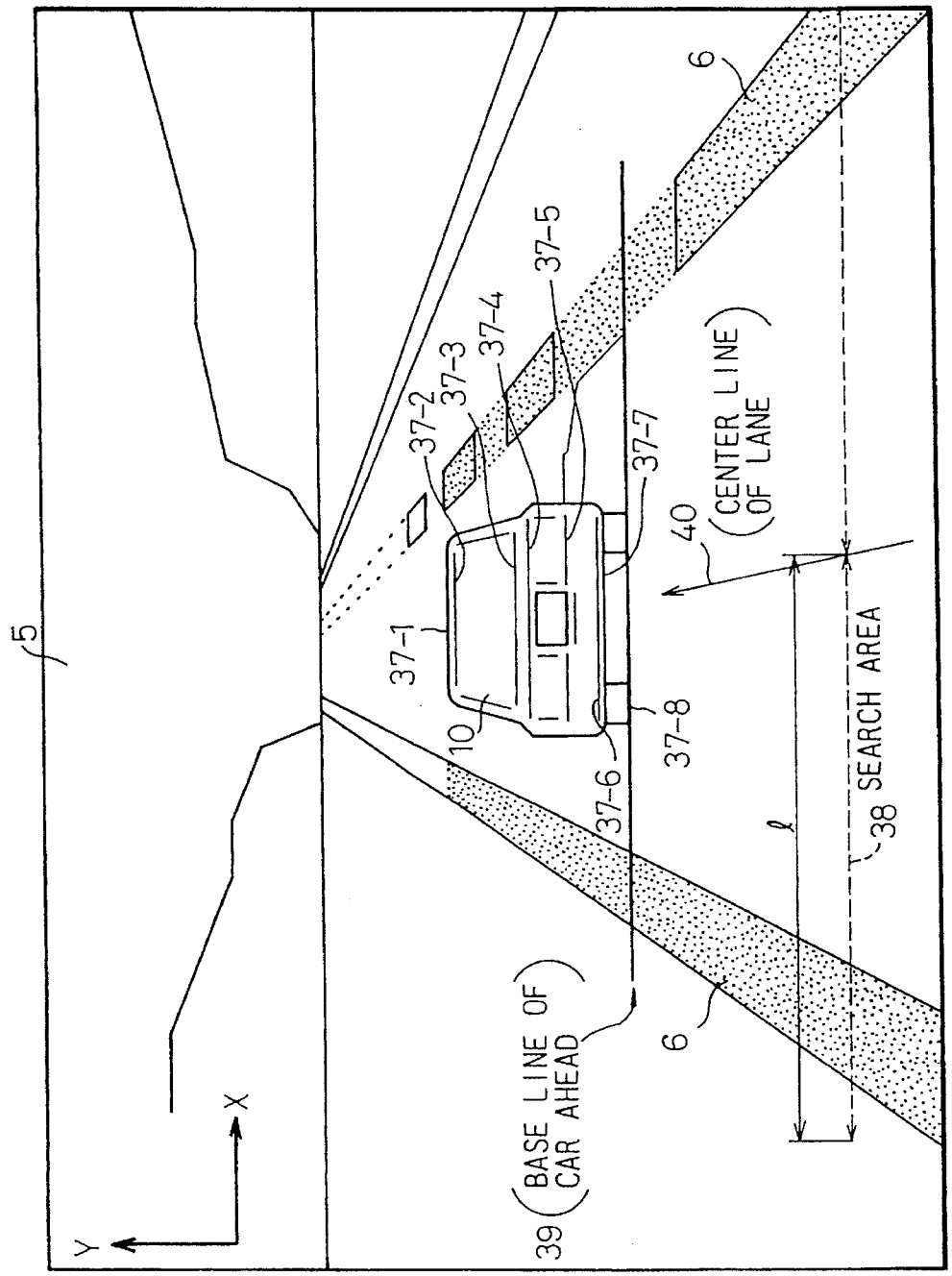
FIG. 3 explains a process carried out by a unit for determining a base line of a car running ahead in the apparatus of the present invention.

FIG. 2 shows the road image 5 provided by the image recording unit 1 mounted on the car, according to the first aspect of the present invention. FIG. 3 shows an edge image showing contours of objects prepared according to the road image 5 with use of a proper spatial filter. The search line is moved on the edge image, to find horizontal edges 37 in the edge image.

The search line is moved toward a distal end in a predetermined area in the edge image, to detect horizontal edges. According to a distribution of the horizontal edges, a base line 39 of the car 10 running ahead is determined.

According to the base line 39 of the car ahead, a predetermined area is set in the image. In the predetermined area, horizontal edges, vertical projections of the horizontal edges, or a histogram of the horizontal edges is obtained. A position where the projections or the histogram meets preset conditions is determined to be the position of the car ahead on the base line.

Before recognizing the position of the car ahead, the present invention recognizes traffic lines painted on the road, to determine a lane in which the car ahead is running. This results in correctly and quickly recognizing the position of the car ahead.

If there are a plurality of probable base lines of the car ahead, one that is closest to the proximal end of the image is selected as the base line of the car ahead.

For example, the edge image 5 may include horizontal edges 37-1 to 37-8. When the search line is moved onto the horizontal edge 37-8, the number of edge components of the horizontal edge 37-8 is counted by a proper counter. If the number is over a preset value, the horizontal edge 37-8 is selected as a probable base line.

Namely, if the number of pixels each including a horizontal edge component on the search line exceeds the preset value, a horizontal edge on the search line is selected as a candidate of the base line 39 of the car ahead.

The search line is moved from the probable base line 37-8 toward the distal end in the predetermined area in the image, to find another probable base line. If the predetermined area contains a plurality of probable base lines (corresponding to the horizontal edges 37-7 to 37-1 in FIG. 3) each having more pixels than the predetermined number, the first probable base line 37-8 is determined to be the base line 39 of the car ahead.

In this way, the apparatus for recognizing the road environment has the road image recording unit 1 mounted on a car to pick up an image of a road; the unit 2 for preparing an edge image showing contours of objects according to the road image; the base line decision unit 31 for moving a search line from a proximal end toward a distal end in the edge image, to find a boundary between a car ahead and the road according to the condition of each horizontal edge on the search line; the search area decision unit 32 for setting an area in which the horizontal position of the car ahead is determined along the base line; and the unit 33 for determining the horizontal position of the car ahead according to horizontal edge components counted by a counter.

It is preferable to arrange the unit 34 for calculating a distance to the car ahead according to the base line of the car ahead determined by the unit 33 and the setting conditions of the image recording unit.

In addition, it is preferable to arrange, in front of the base line decision unit 31, the unit 30 for recognizing traffic lines painted on the road.

As explained above, the present invention prepares a predetermined area 41 in which the search line is moved. The area 41 is formed on the horizontal edge on which the base line of the car ahead exists. The area 41 has a height H and a width W.

Figure 4:
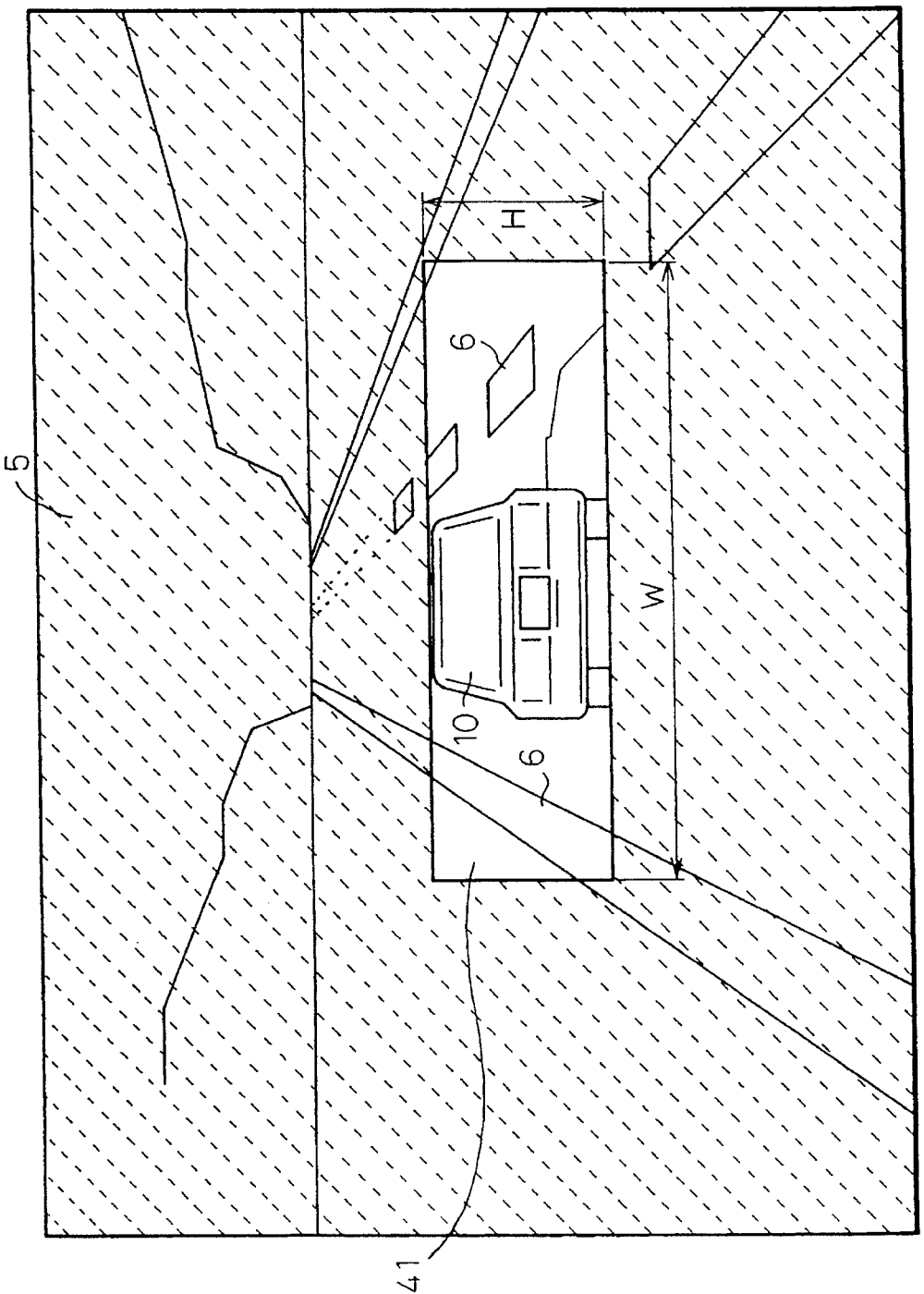
FIG. 4 explains a process carried out by a unit for determining a search area for a car running ahead in the apparatus of the present invention.

In FIG. 4, an actual distance to the car ahead on the road is calculated according to coordinates of the base line of the car ahead on the image. At the position of the car ahead on the road, a search area having predetermined height and width is defined. A search area corresponding to the search area defined on the road is prepared on the image. The whole area except for the search area on the image is masked as shown in FIG. 4.

The height H of the area 41 is determined according to the height of a standard car, and the width W is determined according to the width of a lane on a road.

For example, the height H of the area 41 may correspond to an actual dimension of 1.5 m, and the width W to an actual dimension of 4.0 m.

The edge image extraction unit 2 according to the present invention employs a spatial filter for detecting edges according to pixels representing different densities in a road image, to form an edge image showing contours of objects.

According to the present invention, any spatial filter is employable to detect edges. For example, a known spatial filter employing SOBEL operators shown in FIG. 6 is employable. FIG. 6(a) shows operators for detecting vertical edges, and FIG. 6(b) shows operators for detecting horizontal edges. The present invention must detect horizontal edges, so that operators such as those of FIG. 6(b) may be employed to form a filter. Every pixel value in an obtained road image is multiplied by the operators, to enhance the pixel values of particular pixels.

The present invention determines a horizontal edge point at a position where the absolute value of a pixel exceeds a threshold. In a road image, a car running ahead provides many horizontal edges. Accordingly, these horizontal edges are used as basic data for recognizing the car ahead.

The traffic line recognition unit 30 uses the edge image prepared by the edge image extraction unit 2, to recognize left and right traffic lines 6. These traffic lines are used to determine a lane where the car itself is running as well as a center line 40 of the lane (FIG. 2). This technique firstly determines a lane where the car itself is running and eliminates noise such as objects outside the lane, and then, searches for a car running ahead.

The base line decision unit 31 sets a search line having a predetermined length in right and left directions from the center line 40. The search line is moved from a proximal end of a road image toward a distal end thereof. The base line of the car running ahead is recognized according to each horizontal edge on the search line.

Pixel values are sampled on the search line at predetermined intervals. If the number of pixels each containing a horizontal edge component among the sampled pixels is over a preset value "n," the horizontal edge on the search line is determined to be a probable base line of the car ahead. The search line is moved toward the distal end within a preset scan area. Any horizontal edge that contains "n" or more pixels each containing a horizontal edge component is selected as a probable base line of the car ahead. If the number of the probable base lines exceeds "N" in the preset scan area, it is determined that there is a car running ahead, and the first one of the probable base lines is selected as the base line of the car ahead.

The reason why the present invention examines horizontal edges with the search line is because the back shape of a car involves many horizontal edges. This technique will not mistake shadows for the base line of the car ahead. The length of the search line may be longer than the width of a lane, to recognize a car that is running over a traffic line or a car that cuts in.

The unit 33 for determining the position of a car running ahead sets a recognition frame 42 in the search area 41 as shown in FIG. 5. The recognition frame 42 has given height and width. The recognition frame 42 is moved, and a position where the frame 42 involves the largest number of pixels each containing a horizontal edge component is determined to be the position of the car ahead.

The position of the car ahead may be determined according to a distribution of horizontal edges in the search area 41. The position of the car ahead may be determined according to vertical projections of pixels each containing a horizontal edge component along horizontal edges in the search area 41. As shown in FIG. 5, a histogram of horizontal edge components may be prepared, and a position where the frame 42 contains the largest number of pixels each having a horizontal edge component may be determined to be the position of the car ahead.

Alternatively, symmetry of the recognition frame 42 along a vertical center line is detected, and a position where the frame 42 shows the highest symmetry is determined to be the position of the car ahead.

It is possible to prepare the recognition frame 42 of predetermined size in the search area 41, move the recognition frame 42 in the search area 41, detect at each position the number of pixels each containing a horizontal edge component as well as the symmetry of the recognition frame 42 along a vertical center line thereof, provide an evaluation value of the recognition frame 42 at each position according to the symmetry, and determine a position that provides the highest evaluation value as the position of the car ahead.

It is possible to move the recognition frame in the search area, detect at each position the number of pixels each containing a horizontal edge component as well as the symmetry of the recognition frame along a vertical center line thereof, and determine a position that provides the largest number of pixels and the highest symmetry as the position of the car ahead.

The sizes of the search area and recognition frame on a screen are determined according to the setting conditions of the image record unit 1 on the car such that the scaling of an actual object is constant on the screen.

The distance calculation unit 34 calculates an actual distance on the road to the car ahead and a positional relationship between the car, which carries the invention, and the car ahead according to the position of the car ahead determined by the unit 33. The distance and positional relationship are obtained according to the setting conditions of the television camera and the position of the car ahead on the screen.

As explained above, the present invention picks up an image of a road with a television camera mounted on a car, and even if the image involves noise, correctly and quickly recognizes a car running ahead. The present invention also recognizes a positional relationship between the car ahead and a lane of the road.

An apparatus for recognizing road environment according to the second aspect of the present invention will be explained with reference to drawings.

Figure 7:
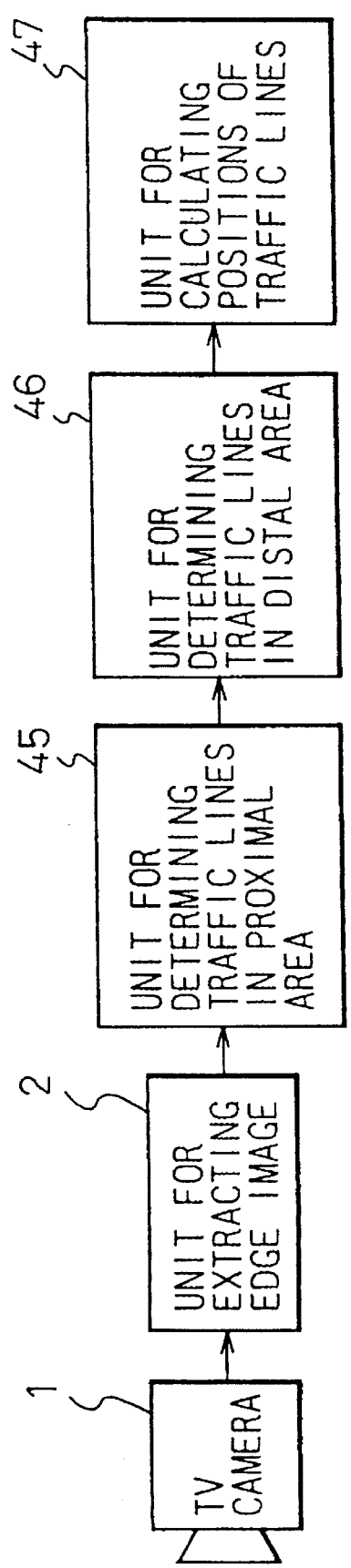
FIG. 7 is a block diagram showing an apparatus for recognizing road environment according to the second aspect of the present invention.

FIG. 7 is a block diagram showing the apparatus for recognizing road environment according to the second aspect of the present invention. The apparatus has an image recording unit 1 such as a television camera to provide an image of a road; an edge image extraction unit 2 for preparing an edge image showing contours of objects according to the image provided by the image record unit 1; a traffic line decision unit 45 for extracting probable points out of a proximal area of the edge image and determining traffic lines according to the probable points; a traffic line trace unit 46 for extending the traffic lines determined by the unit 45 into a distal area of the edge image and determining the positions of the traffic lines; and a unit 47 for calculating the actual positions of the traffic lines on the road.

The apparatus according to the second aspect of the present invention easily and surely recognizes white and yellow traffic lines. The image record unit 1, i.e., the television camera provides an image of a road. The edge image extraction unit 2 prepares an edge image showing contours of objects according to the image provided by the image record unit 1. The traffic line decision unit 45 extracts probable points out of a proximal area of the edge image and determines traffic lines according to the probable points. The traffic line trace unit 46 extends the traffic lines determined by the unit 45 into a distal area of the edge image and determines the positions of the traffic lines. The calculation unit 47 calculates the actual positions of the traffic lines on the road.

Figure 8:
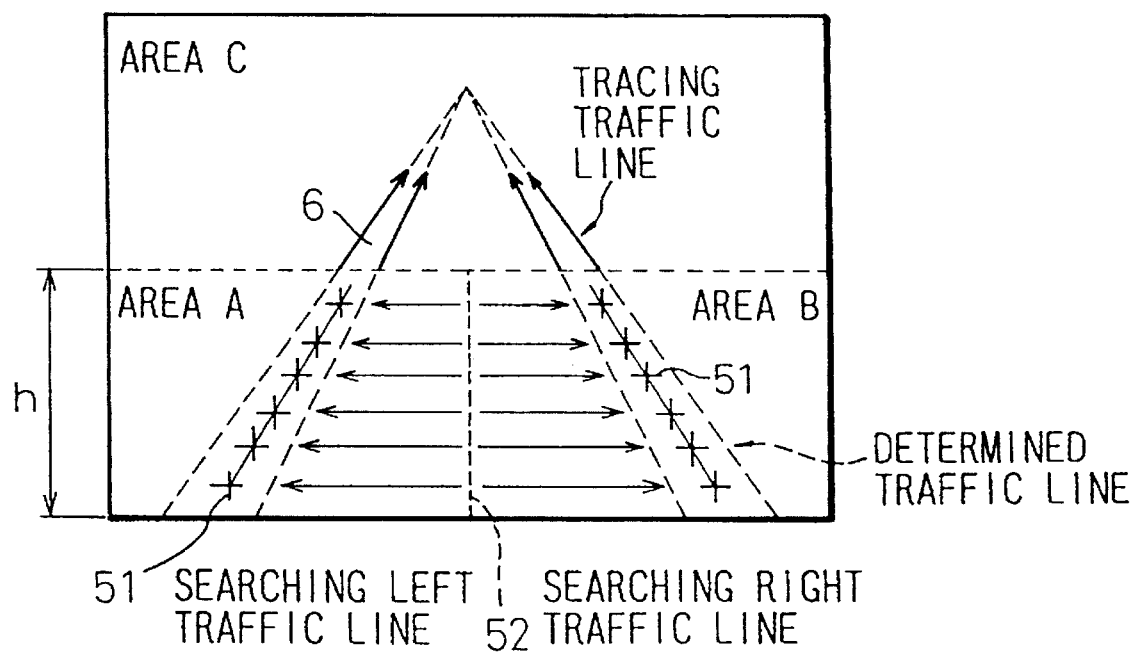
FIG. 8 explains a method of recognizing traffic lines according to the second aspect of the present invention.

The apparatus of FIG. 7 according to the second aspect of the present invention will be explained with reference to FIG. 8. The image record unit provides an image 5 of a road adjacent to the car on which the image record unit is mounted. An area is defined in the image 5, and a plurality of probable points 51 to determine traffic lines are longitudinally plotted in the area. The area is halved along a vertical center line 52 into a left first area A and a right second area B. The remaining area of the image 5 is defined as a third area C. The first area A is leftwardly searched for probable points to determine a traffic line. The second area B is rightwardly searched for probable points to determine a traffic line. The traffic lines determined in the first and second areas A and B are extended into the third area C, to completely determine the traffic lines.

The reason why traffic lines are firstly determined in the first and second areas A and B is because the proximal part of the image includes a larger number of pixels in a traffic line and better edges than those in the distal part of the image and because the proximal part includes a smaller number of obstacles such as a car running ahead than in the distal part. The first and second areas A and B may be defined with greater width to involve a larger number of probable points to determine traffic lines. This removes erroneous probable points due to contours of the car ahead and correctly recognizes the traffic lines. If the traffic lines are discontinuous, the first and second areas A and B may be extended sideways beyond an interval between the traffic line segments, to correctly detect the traffic lines.

The traffic lines determined in the first and second areas A and B are extended into the third area C, to completely determine the traffic lines. This is because the distal part frequently involves obstacles such as a car or curved traffic lines, and it is difficult in the distal part to recognize the traffic lines by scanning the image from the center to left and right sides of the distal part.

In this way, the apparatus for recognizing road environment according to the second aspect of the present invention obtains a road image 5 with the image recording unit 1 mounted on the car, prepares an edge image showing contours of objects according to the road image 5, halves a proximal part of the edge image into a left first area A and a right second area B, defines a distal part of the edge image as a third area C, leftwardly searches the first area A for probable points to determine a traffic line, rightwardly searches the second area B for probable points to determine a traffic line, and extends the traffic lines determined in the first and second areas A and B into the third area C, to completely determine the traffic lines.

The first and second areas A and B are scanned for pixel values from a boundary between them in opposite directions. The scanning of the areas A and B is carried out in synchronization.

The edge image showing contours of objects is prepared for the whole area of the road image 5 provided by the image recording unit 1.

Pixels of the road image are horizontally scanned with a spatial filter, to find absolute values of vertical edge components of the pixels. Any pixel whose absolute value exceeds a predetermined threshold is determined as an edge point.

Examples of a system for recognizing traffic lines in the apparatus for recognizing road environment according to the second aspect of the present invention will be explained with reference to FIGS. 9 to 20.

Figure 9:
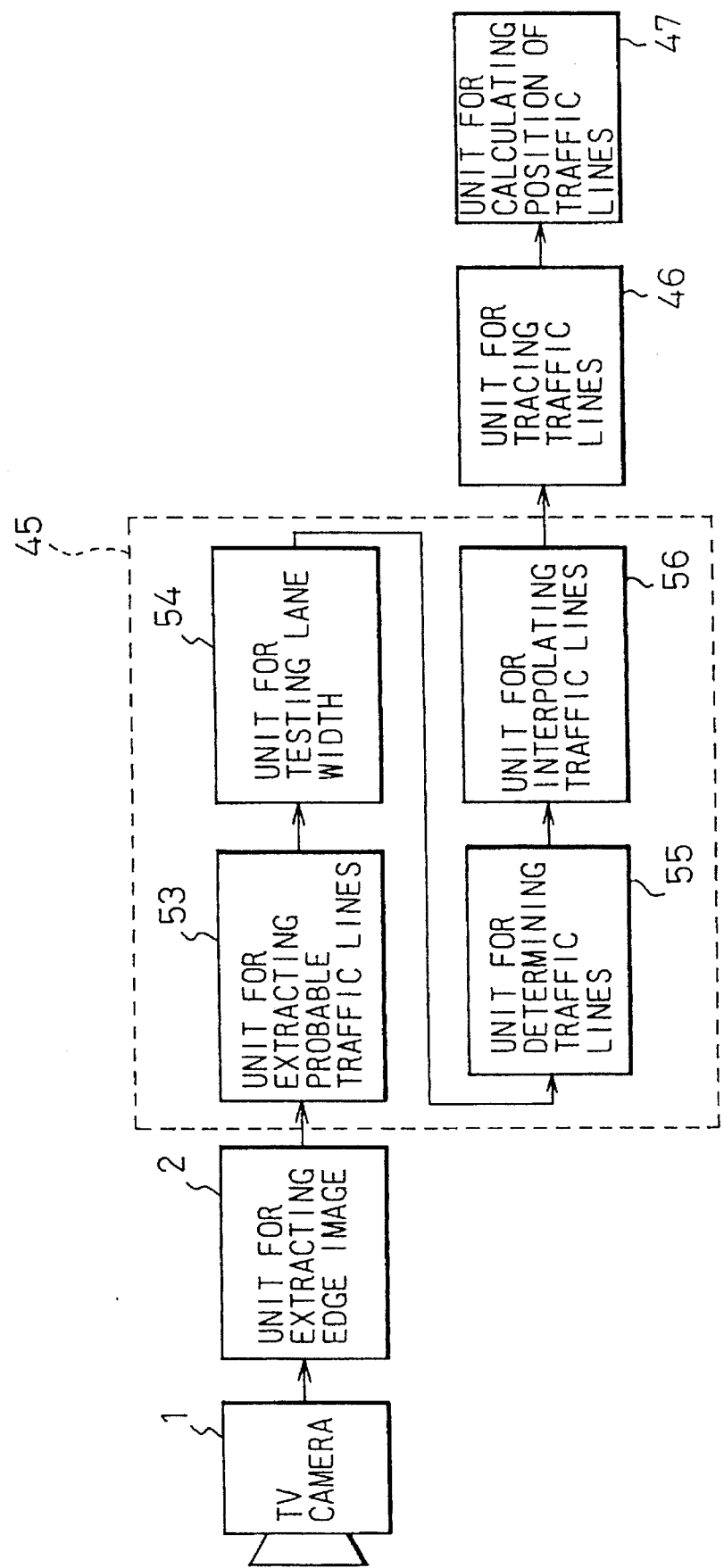
FIG. 9 is a block diagram showing an embodiment according to the second aspect of the present invention.

FIG. 9 is a block diagram showing one of the examples. In comparison with FIG. 7, FIG. 9 shows the details of a unit 45 for determining traffic lines in a proximal area.

The unit 45 includes a unit 53 for extracting probable traffic lines, a unit 54 for testing the width of a lane, a unit 55 for determining traffic lines, and a unit 56 for interpolating the traffic lines.

Figure 10:
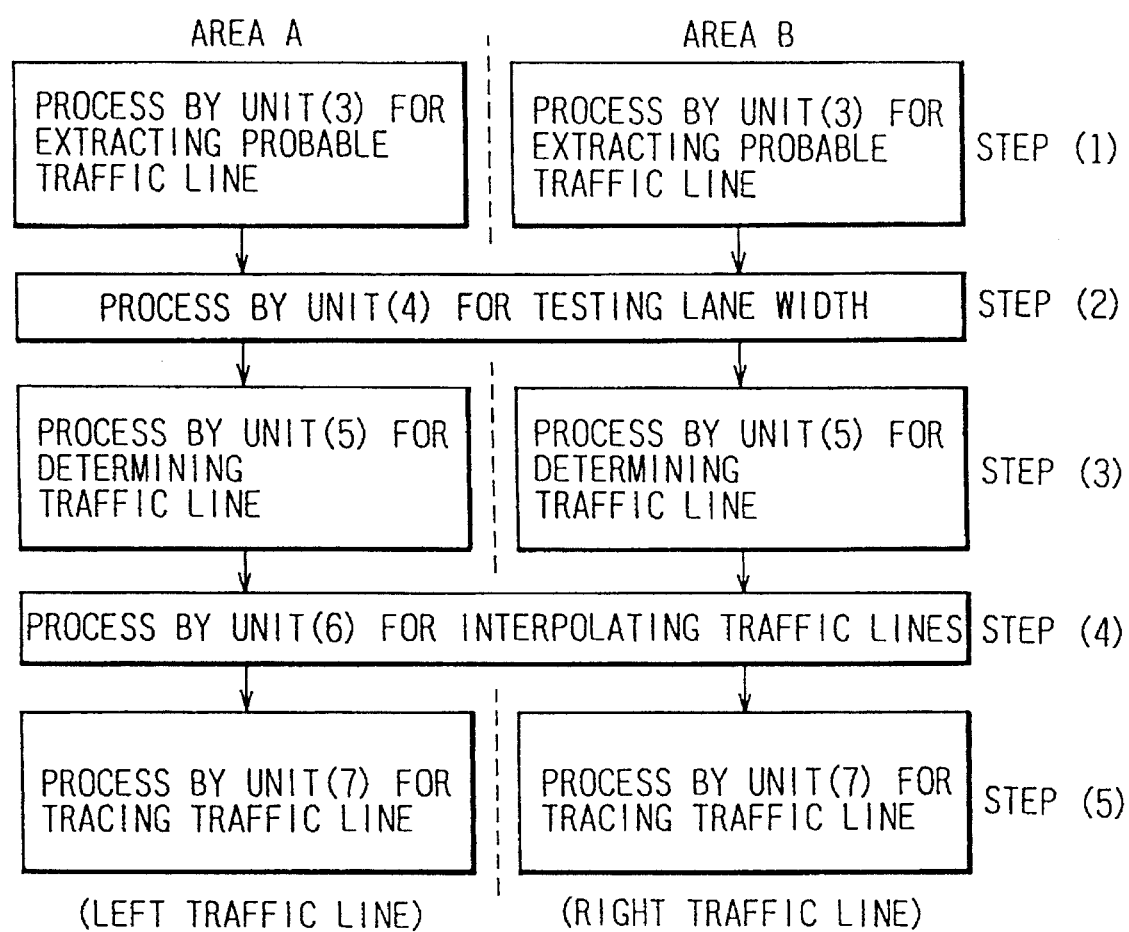
FIG. 10 is a flowchart showing steps carried out by the apparatus according to the second aspect of the present invention.

FIG. 10 is a flowchart showing steps carried out by the arrangement of FIG. 9. An image recording unit 1 including a television camera provides a road image 5. An edge image extraction unit 2 provides an edge image showing contours of objects according to the image 5. In step (1), the unit 53 extracts probable points 51 to determine traffic lines in each of first and second areas A and B defined in the edge image. In step (2), the unit 54 selects very probable points 57 to determine a traffic line 6. In step (3), the unit 55 determines actual traffic line 6 according to the continuity of the probable points 51 and the number of the very probable points 57.

A horizontal line nearest to the image record unit 1, i.e., the television camera is defined as a nearest line 58 in the image. If the traffic line 6 does not reach the nearest line 58, or if the traffic line 6 is defined only in one of the first and second areas A and B, the unit 56 interpolates the traffic line 6 in step (4) to completely determine the traffic line.

In step (5), a traffic line trace unit 46 extends the traffic lines 6 determined in the first and second areas A and B into the third area C, to determine the traffic lines in the distal area.

A calculation unit 47 calculates the position of the traffic lines on the actual road.

Similar to the first aspect of the present invention, the edge image extraction unit 2 according to the second aspect of the present invention employs a spatial filter for detecting edges according to pixels representing different densities in a road image, to form an edge image showing contours of objects. There are several spatial filters for detecting edges. For example, the spatial filter of FIG. 6 employing SOBEL operators is employable. This example of the present invention employs the operators shown in FIG. 6(*a*) for detecting vertical edges.

When recognizing contours of traffic lines in a road image, vertical edges are most important. In particular, in an expressway, only the vertical edges are effective due to the curvature of the road. After the spatial filtering of FIG. 6(*a*), any pixel having a positive value and an absolute value greater than a threshold defines a positive edge, and any pixel having a negative value and an absolute value greater than the threshold defines a negative edge.

The positive edge is defined when pixel values change rightwardly from high to low in the image and when a difference between the high and low values is greater than a threshold. The negative edge is defined when pixel values change from low to high and when a difference between the low and high values is greater than the threshold.

Figure 11:
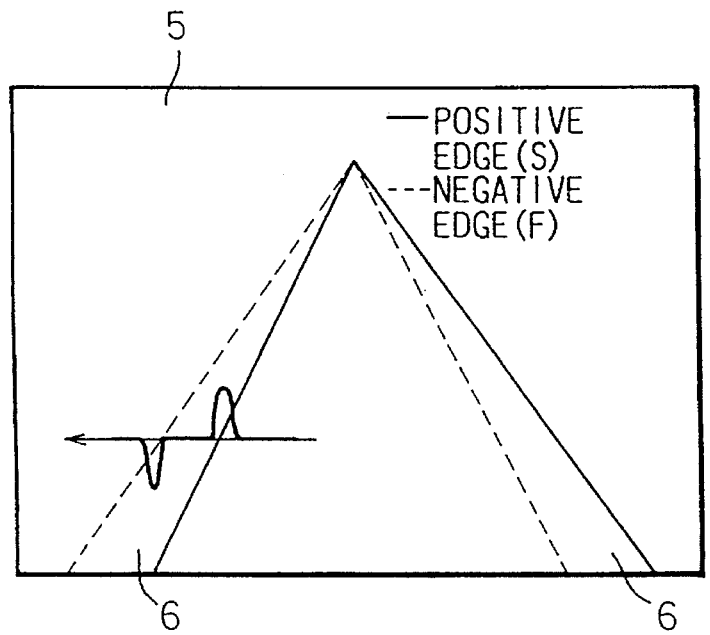
FIG. 11 shows a vertical edge image provided by the apparatus according to the second aspect of the present invention of FIG. 7.

FIG. 11 shows a road image 5 formed of positive and negative edges.

The present invention processes an image with 256 levels of pixel values ranging from 0 to 255. To recognize a traffic line, for example, a white traffic line, the level 0 is assigned for black, the level 255 for white, and the intermediate levels for gray levels.

In FIG. 11, pixels of the road image 5 are horizontally scanned from the center of the image 5. When a pixel corresponding to an edge of a white traffic line is scanned, a high pixel value will be detected to indicate a positive edge S. When the scanning goes out of the white traffic line, a low pixel value will be detected to indicate a negative edge F.

Figure 12:
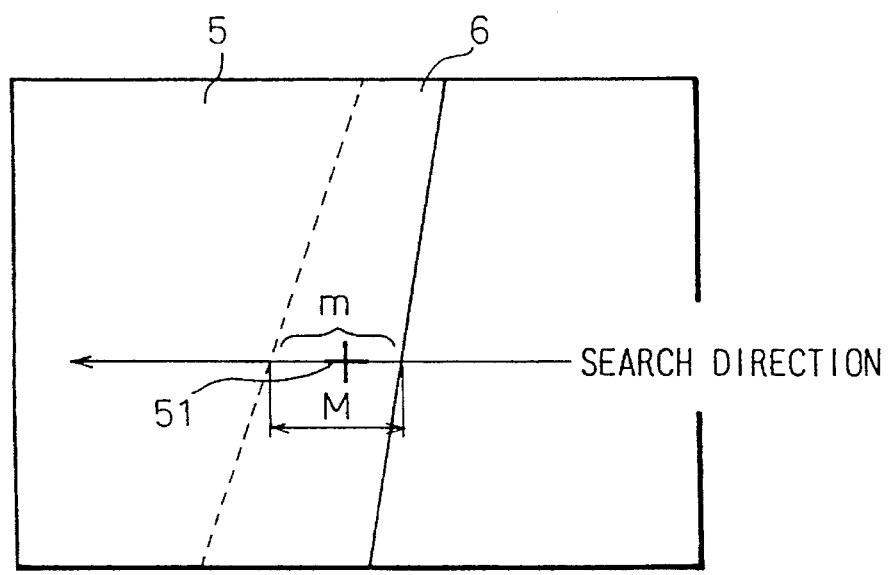
FIG. 12 shows a process of testing a traffic line in the apparatus of the present invention.

FIG. 12 shows a way of detecting a traffic line.

The edge image obtained with the spatial filter is formed of the positive edges having positive pixel values and the negative edges having negative pixels values. To recognize a traffic line, the edge image is horizontally scanned in each of the first and second areas A and B. When there are adjacent positive and negative edges and when a space m between the edges is within a predetermined traffic line width M, the positive and negative edges or an optional point between the edges is extracted as a probable point to define a traffic line.

The probable point extraction unit 53 extracts a plurality of probable points 51 to define a traffic line.

The same process is carried out in each of the first and second areas A and B, and therefore, the process in the first area A will be explained.

In FIG. 12, the area is leftwardly horizontally scanned to find a probable point 51 to define a traffic line.

When a positive edge S and then a negative edge F are found and when a space m between the edges is within the predetermined traffic line width M, the probable point 51 is selected.

The height and angle of depression of the television camera mounted on the car are known. Accordingly, an actual length on a road is translatable into a length on the image. Namely, the width of the traffic line on the image is tested according to the actual width M of a traffic line painted on the road.

In the second area B, a negative edge firstly appears and then a positive edge.

Figure 13:
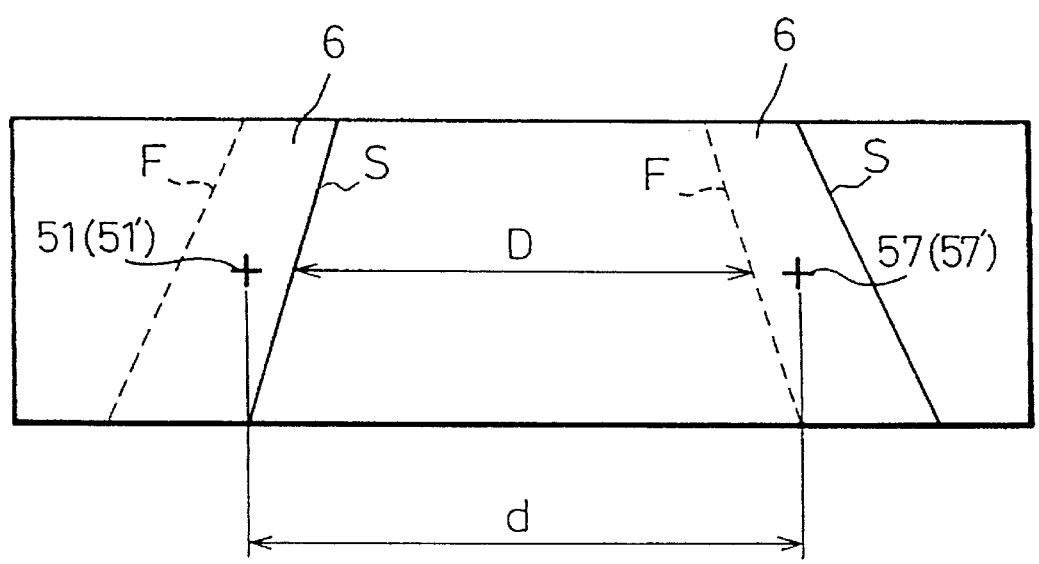
FIG. 13 shows a process of testing the width of a traffic line in the apparatus of the present invention.

In FIG. 13, the unit 54 tests whether or not a space d between left and right probable points 51 and 57 that are on the same horizontal line and obtained in the first and second areas A and B, respectively, is within an acceptable range of a lane width D. If the space d is within the width D, the probable points 51 and 57 are determined to be very probable points 51' and 57' to define traffic lines.

Figure 14:
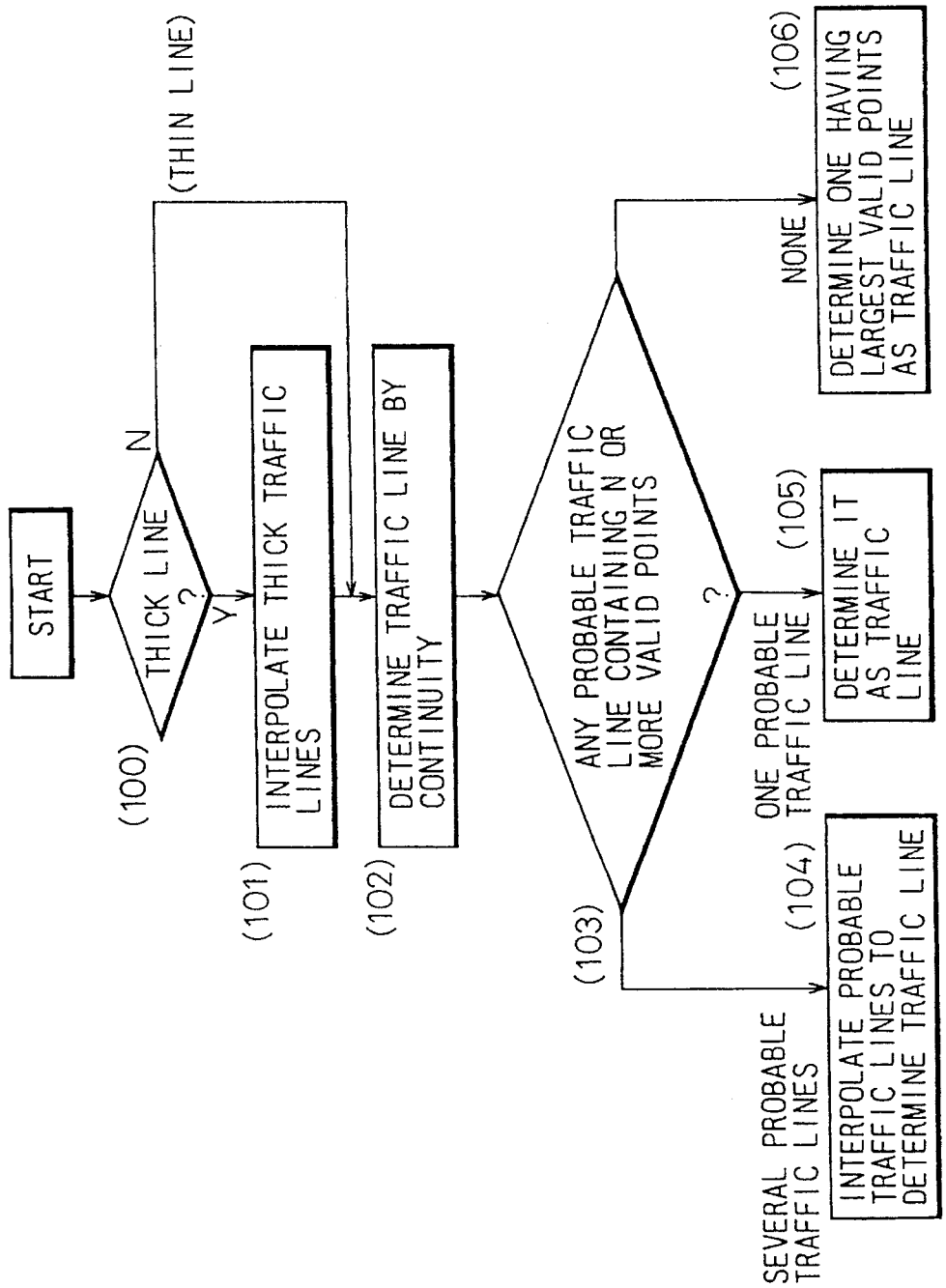
FIG. 14 is a flowchart showing steps of determining a traffic line carried out by a traffic line decision unit in the apparatus according to the second aspect of the present invention.

FIG. 14 is a flowchart showing steps carried out by the traffic line decision unit 55.

This flowchart is applicable to any one of the first and second areas A and B.

The traffic line decision unit 55 determines whether or not the probable traffic lines recognized by the previous process are actual traffic lines.

Actual traffic lines painted on a road may be continuous or discontinuous, or they may represent crosswalks or marks for checking a distance between two cars, etc. The traffic lines have different widths.

Thin traffic lines are usually continuous, or discontinuous with long continuous segments. Thick traffic lines usually involve short discontinuous segments to indicate junctions and uphill slopes. The thick traffic lines are difficult to recognize due to the discontinuity.

Step (100) determines whether or not a traffic line is thick. If it is thin, i.e., if the step (100) provides NO, step (101) is skipped, and step (102) handles the traffic line as a continuous traffic line. If the step (100) provides YES to indicate that the traffic line is thick, the step (101) interpolates probable points to define the thick traffic line.

The step (102) determines a probable traffic line according to the continuity of the probable points.

Figure 15:
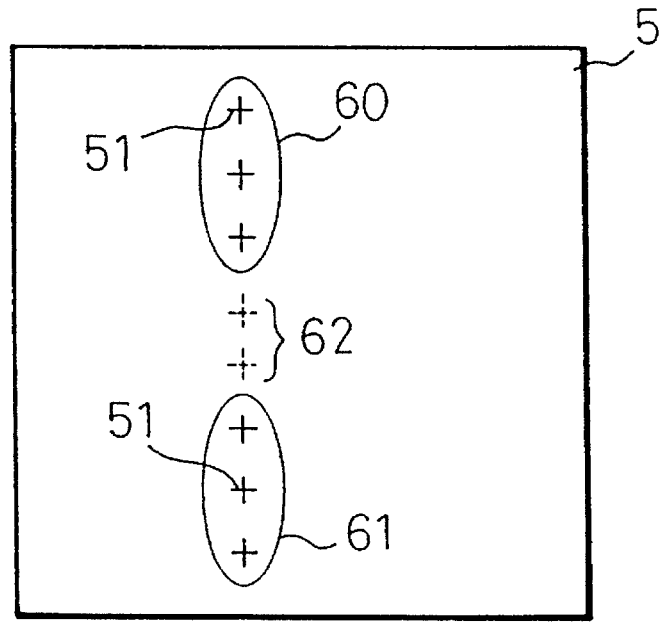
FIG. 15 shows a process of interpolating probable points to determine a thick traffic line carried out by the traffic line decision unit in the apparatus according to the second aspect of the present invention.

In FIG. 15, the first area A in the edge image involves a first group 60 containing three probable points 51 and a second group 61 containing three probable points 51. The first and second groups 60 and 61 are spaced apart from each other and on or around the same longitudinal axis. A space 62 between the groups 60 and 61 is interpolated with probable points 51, to form a continuous line.

In this way, it is determined whether or not a traffic line defined by probable points found in any one of the first and second areas A and B is thick, and if it is thick, the probable points for the thick line are interpolated at predetermined intervals, to determine the thick traffic line.

Figure 16:
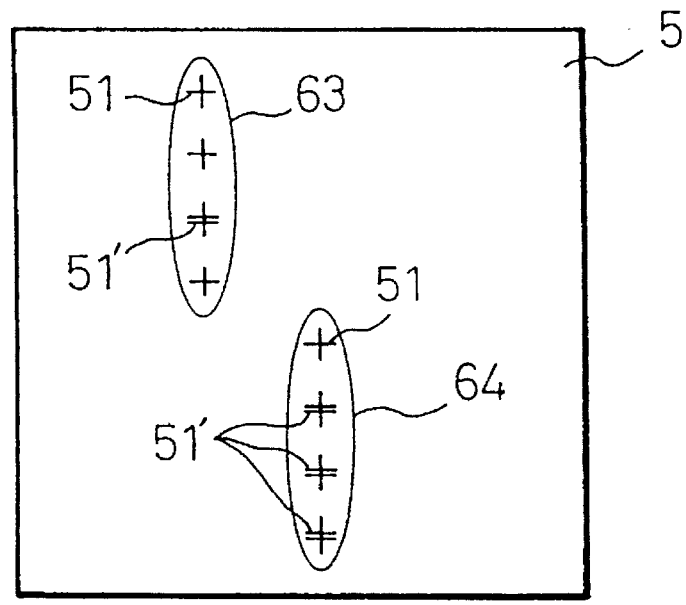
FIG. 16 shows a process of determining a traffic line carried out by the traffic line decision unit in the apparatus according to the second aspect of the present invention.

In FIG. 16, the probable points 51 are plotted on a coordinate system on an actual road. If a longitudinal positional difference between adjacent ones of the probable points 51 is within a preset threshold and if a difference between the widths of traffic lines defined by the adjacent ones of the probable points is within a preset range, such probable points are connected to each other. A probable traffic line 63 is defined with the connected probable points if the number of the connected probable points exceeds a preset value.

Namely, this example selects probable points in any one of the first and second areas A and B if a longitudinal positional difference between adjacent ones of the probable points is within the preset threshold and if a difference between the widths of traffic lines defined by the adjacent ones of the probable points is within the preset range, connects the selected probable points together, and defines a probable traffic line with the probable points or with groups of the probable points if the number of the connected probable points exceeds the preset value.

A traffic line may be defined with probable points that are found in any one of the first and second areas A and B and are longitudinally adjacent to one another, if the probable points involve very probable points more than a predetermined number.

Step (103) determines whether or not the probable points include N pieces of very probable points. If there are N or more very probable points, they define a traffic line 6.

In FIG. 16, if N=3, a probable traffic line 63 is not determined to be the traffic line 6. Since a probable traffic line 64 includes three very probable points 51', it is determined to be the traffic line 6 in step (105).

If there are a plurality of probable traffic lines 63 and 64 each containing three or more very probable points 51', step (104) interpolates the probable traffic lines 63 and 64 to determine the traffic line 6, similar to the case of FIG. 15.

If there is no probable traffic line including N or more very probable points 51', step (106) selects one having the largest number of probable points among the probable traffic lines as the traffic line 6.

In this way, this example of the present invention defines a traffic line by interpolating groups of probable points found in any one of the first and second areas A and B, if the probable points that are longitudinally adjacent to one another in each group involve more very probable points than the predetermined number. Among a plurality of probable traffic lines found in any one of the first and second areas A and B, one having the largest number of probable points may be determined as a traffic line.

Figure 17:
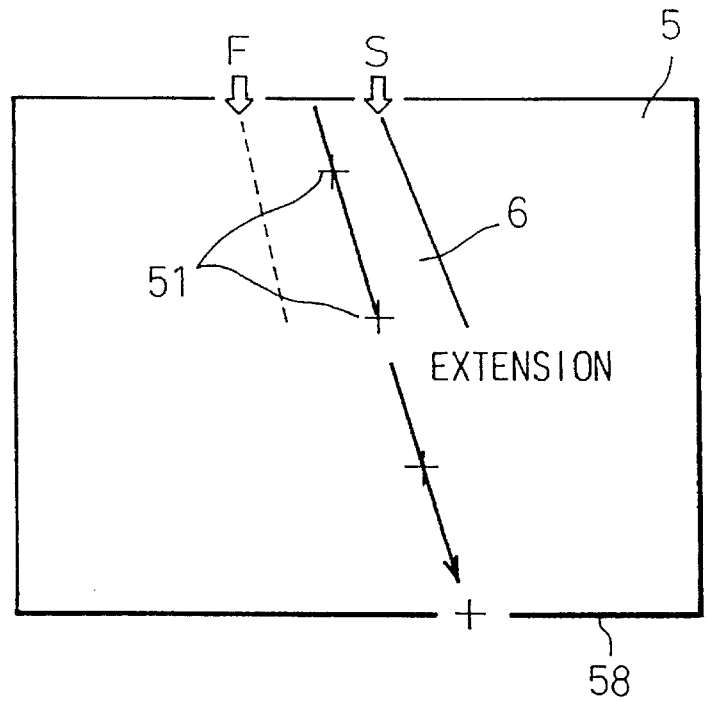
FIG. 17 shows a process of extending a traffic line to a nearest line on an image carried out by a traffic line interpolation unit in the apparatus according to the second aspect of the present invention.
Figure 18:
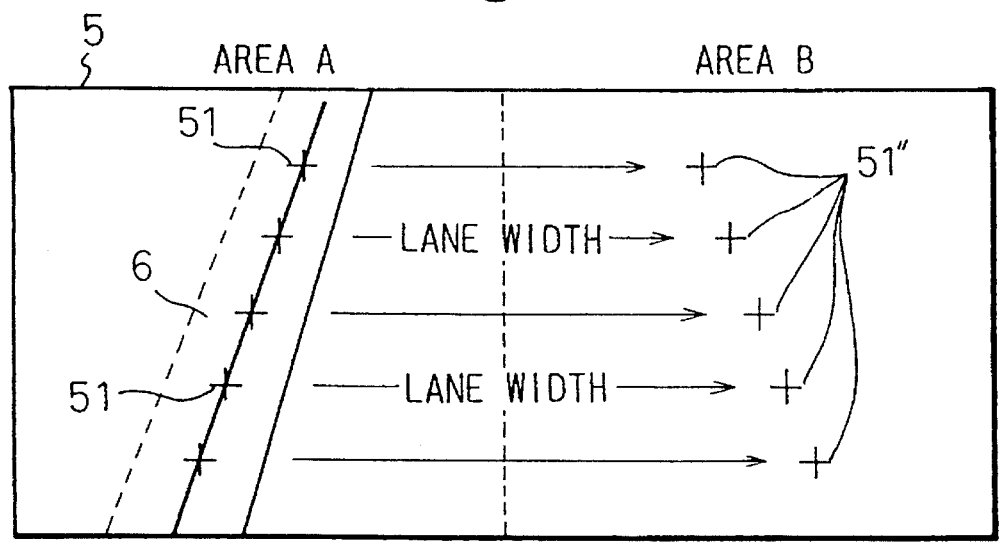
FIG. 18 shows a process of forming a traffic line from another traffic line carried out by the traffic line interpolation unit in the apparatus according to the second aspect of the present invention.

A horizontal line nearest to the image record unit 1, i.e., the television camera is set as a nearest line 58 on the image. If the traffic line 6 determined in any one of the areas A and B has no common point on the nearest line 58, the traffic line interpolation unit 56 extends the traffic line 6 up to the nearest line 58 by interpolation, to complete the traffic line 6 as shown in FIG. 17.

If no traffic line is found in one of the first and second areas A and B, the present invention estimates probable points 51" in the area at positions that are spaced apart from the probable points 51 successfully defined in the other area by the predetermined lane width D and interpolates the estimated probable points 51" to determine a traffic line 6.

In this way, even if a traffic line is unrecognizable due to blur, the position thereof will be determined. Even if the car 10 covers the traffic line 6, the traffic line 6 is recognizable.

In this way, if no traffic line is found in one of the first and second areas A and B, the present invention estimates probable points in the area at positions that are spaced apart from probable points successfully defined in the other area by a predetermined lane width and interpolates the estimated probable points to determine a traffic line.

The trace unit 46 traces and extends the traffic lines 6 determined in the first and second areas A and B into the third area C.

Figure 19:
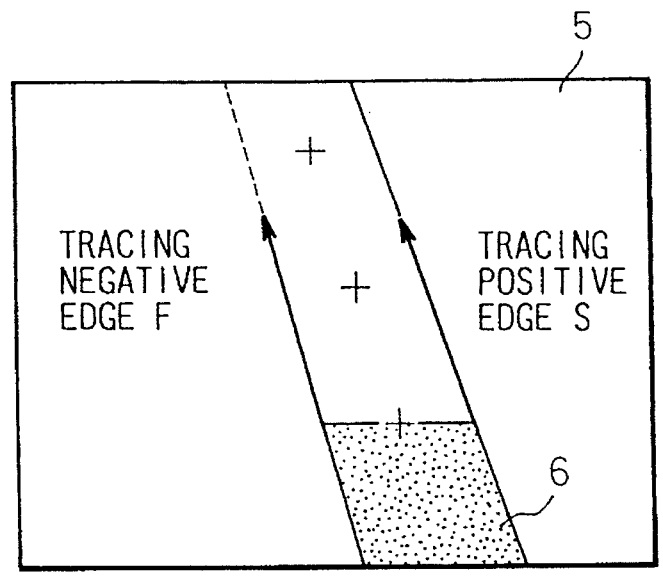
FIG. 19 shows a process of tracing edges of a traffic line carried out by a traffic line trace unit in the apparatus according to the second aspect of the present invention.

As shown in FIG. 19, the traffic line 6 determined in any one of the first and second areas A and B is extended upwardly along the positive and negative edges S and F of the traffic line 6.

Figure 20:
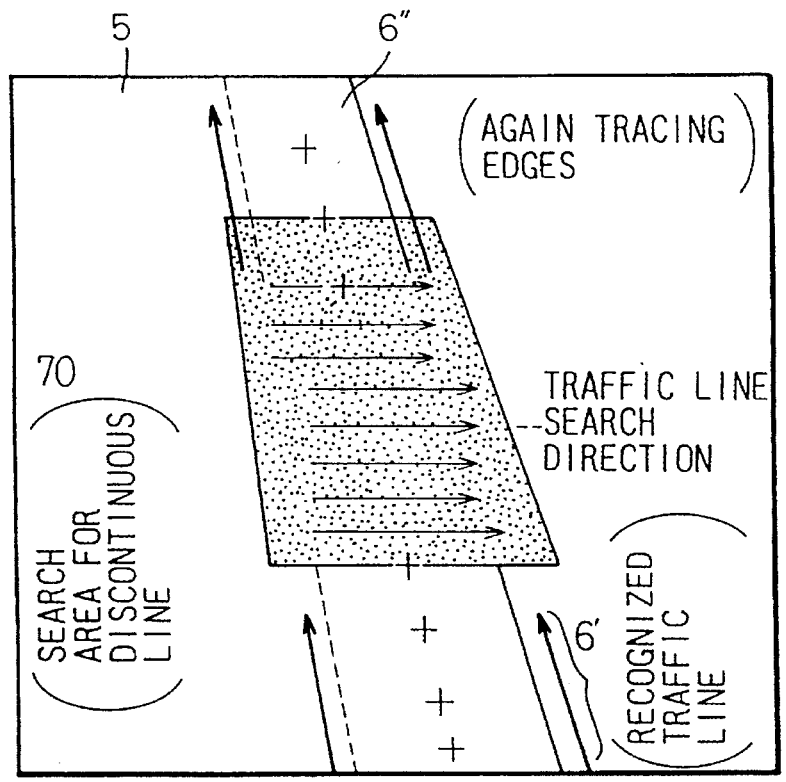
FIG. 20 shows a process of tracing edges of a discontinuous traffic line carried out by the traffic line trace unit in the apparatus according to the second aspect of the present invention.

If the traffic line 6 obtained in any one of the first and second areas A and B is discontinuous, the recognized discontinuous traffic line 6' is extended to form a new search area 70 as shown in FIG. 20. In the search area 70, a traffic line 6" will be found as an extension of the recognized traffic line 6'. According to the detected traffic line 6", edges are repeatedly traced.

Instead of detecting very probable points to define a traffic line by the unit 55, it is possible to select a traffic line having the largest number of probable points.

The traffic line decision unit 55 and traffic line interpolation unit 56 may employ values obtained in a previous image as thresholds for the widths of a traffic line and lane.

In the above explanation, the television camera is set such that the upper end of an image provided by the camera is equal to a distal end. This does not limit the present invention. The television camera may be optionally set.

In this way, the example of the present invention mentioned above recognizes traffic lines in a road image even if the road image involves a car running ahead, discontinuous traffic lines, and shadows.

An apparatus for recognizing road environment according to the third aspect of the present invention will be explained next.

The apparatus employs an image record unit 1 such as a television camera mounted on a car and recognizes traffic lines and a car running ahead under any conditions according to an image provided by the image record unit 1. The third aspect of the present invention more correctly and surely recognizes the traffic lines and the car ahead.

The apparatus according to the third aspect of the present invention is basically the same as those of the first and second aspects. The third aspect adds an afterimage to a road image 5 provided by the image record unit 1 and prepares an edge image showing contours of objects according to the road image with the afterimage.

The afterimage adding process according to the present invention is not particularly limited. For example, the afterimage adding process may be achieved by smoothing consecutive road images 5 provided by the image record unit 1. For example, the apparatus according to the third aspect compares consecutive first and second road images provided by the image record unit 1 mounted on the car with each other, leaves the first road image as it is if a difference between pixel values at the same coordinate position in the first and second road images is within a preset range, updates, if the difference is out of the preset range, the pixel value of the first road image by bringing the pixel value of the first road image closer to the pixel value of the second road image by a preset value, repeats the updating process to form a smoothed image, and carries out the image processes explained with reference to the first and second aspects according to the smoothed image.

The third aspect may bring the pixel value of the first road image closer to the pixel value of the second road image by a value set for the difference between the pixel values of the first and second road images, if the difference is out of the preset range.

The apparatus for recognizing road environment according to the third aspect of the present invention may have the system for recognizing a car running ahead as well as the system for recognizing traffic lines, both mentioned above.

Figure 21:
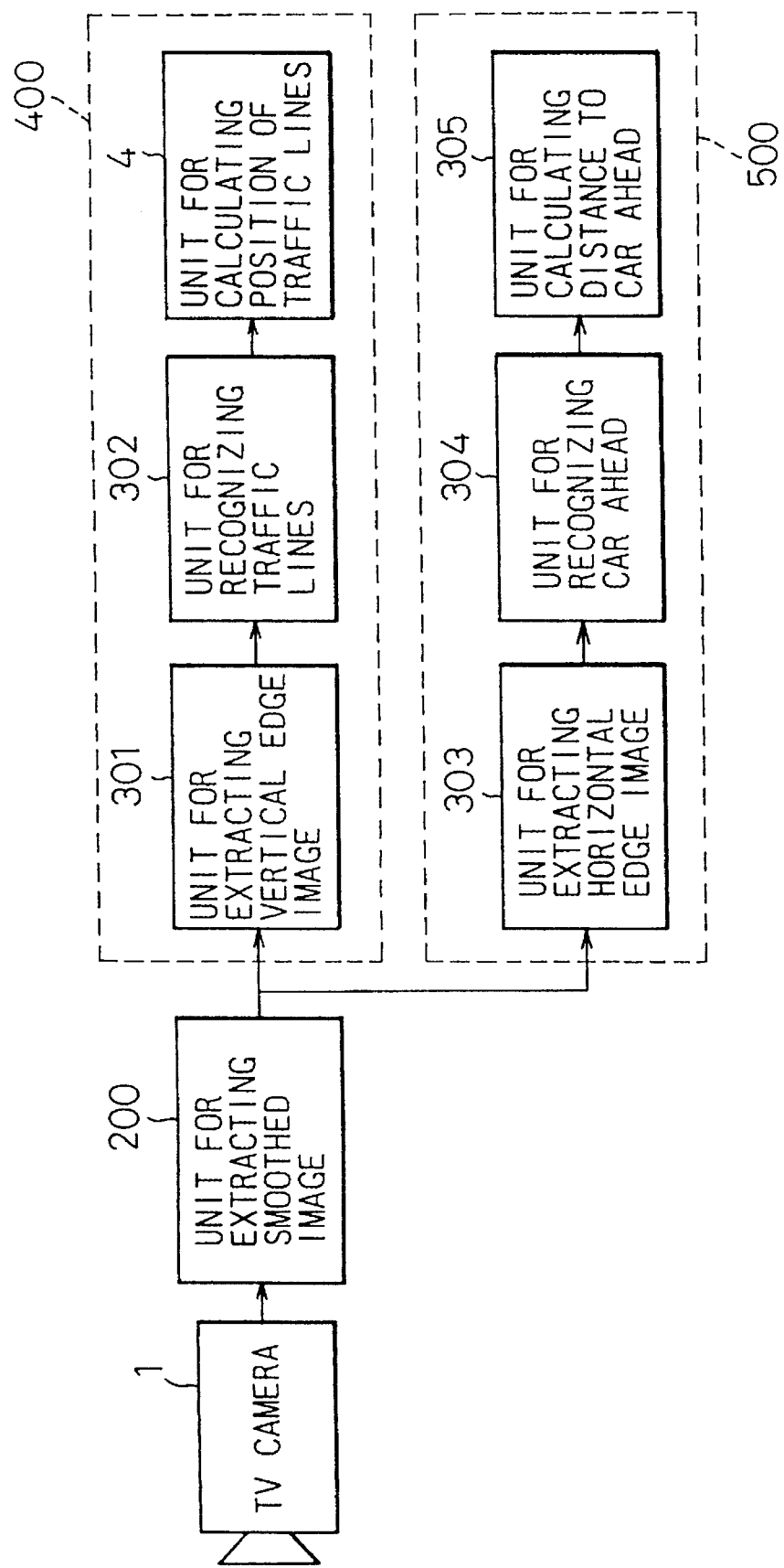
FIG. 21 is a block diagram showing an apparatus for recognizing road environment according to the third aspect of the present invention.

FIG. 21 is a block diagram showing the apparatus for recognizing road environment according to the third aspect of the present invention.

The apparatus has an image record unit 1; a smoothed image extraction unit 200 for carrying out the smoothing process mentioned above on an image provided by the image record unit 1; a traffic line recognition and process unit 400 including a vertical edge image extraction unit 301 for forming a vertical edge image, a traffic line recognition unit 302 for recognizing traffic lines according to an output of the vertical edge image extraction unit 301, and a traffic line position calculation unit 4; and a car recognition and process unit 500 including a horizontal edge image extraction unit 303 for forming a horizontal edge image according to an output of the smoothed image extraction unit 200, a car recognition unit 304 for recognizing the position of a car running ahead according to an output of the horizontal edge image extraction unit 303, and a distance calculation unit 305 for calculating a distance to the car ahead.

Instead of the vertical edge image extraction unit 301, it is possible to employ a unit that uses pixel data related to the color of a traffic line, prepares a binary image according to the pixel data, and recognizes a traffic line according to the binary image.

The traffic line recognition unit 302 of FIG. 21 may be made of the probable traffic line extraction unit 53, lane width test unit 54, traffic line decision unit 55, traffic line interpolation unit 56, and traffic line trace unit 46 of the second aspect of the present invention.

The car recognition unit 304 of FIG. 21 may be made of the base line decision unit 31, search area decision unit 32, and position decision unit 33 of the first aspect of the present invention.

The arrangement and operation of the smoothed image extraction unit 200 will be explained with reference to FIG. 22.

In FIG. 21, the image recording unit 1 such as the television camera provides an image of a road. The smoothed image extraction unit 200 erases noise such as shadows from the image and interpolates discontinuous parts of traffic lines in the image. According to the processed image, the vertical edge image extraction unit 301 provides a vertical edge image.

At the same time, the horizontal edge image extraction unit 303 prepares a horizontal edge image according to the image provided by the smoothed image extraction unit 200.

The smoothing process mentioned above extracts objects that move at slow speed relative to the car itself and that are substantially stopped on a screen. The edge image extraction units, in particular, the horizontal edge image extraction unit 303, provides an image showing only contours of a car running ahead. The car recognition unit 304 prepares a horizontal search line having a predetermined length, moves the search line from a proximal end of the image toward a distal end thereof, and determines an edge on the search line satisfying predetermined conditions as the base line of the car ahead. The distance calculation unit 305 calculates a distance to the car ahead.

Figure 22:
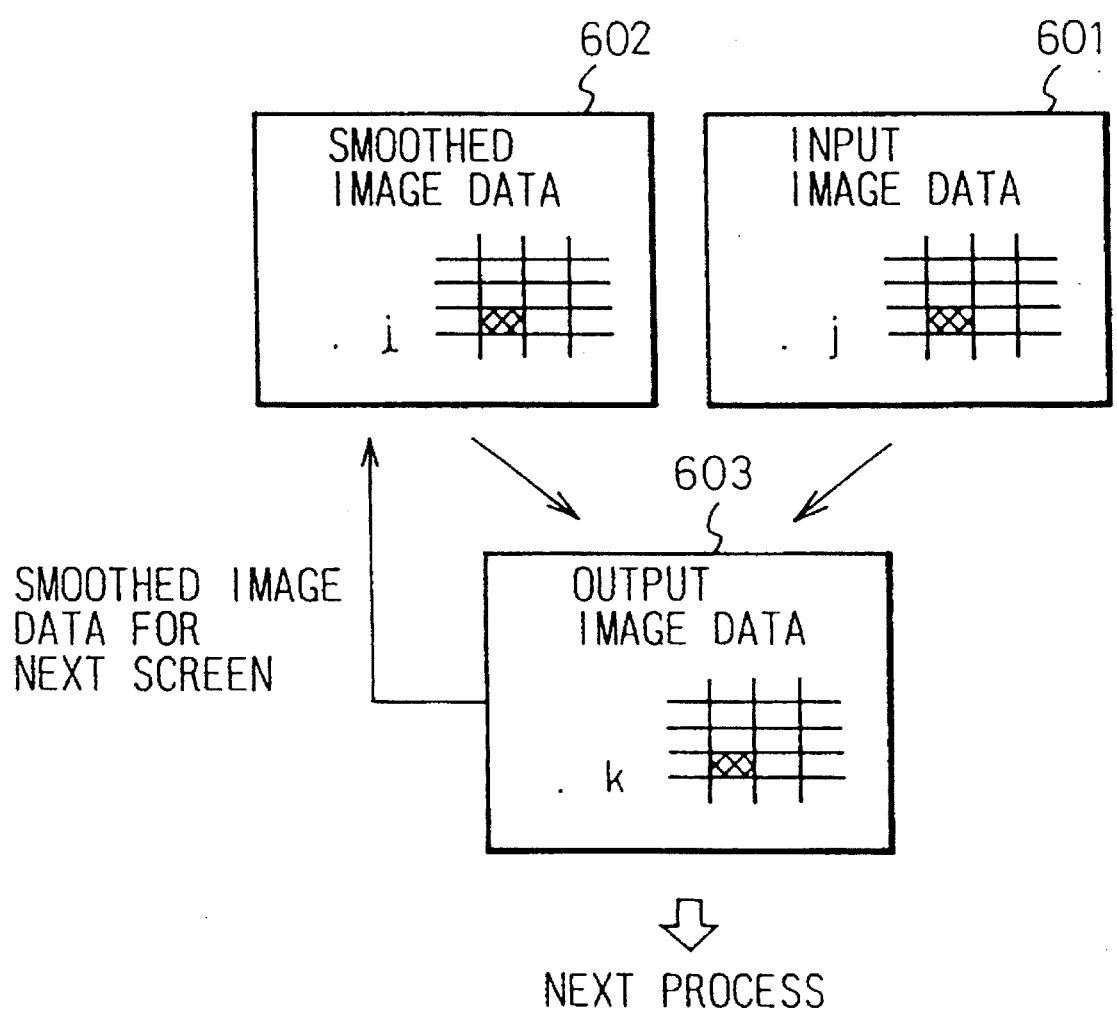
FIG. 22 shows a smoothing process carried out by a smoothed image extraction unit in the apparatus according to the third aspect of the present invention.

FIG. 22 shows an example of the image smoothing process according to the present invention.

The smoothed image extraction unit 200 uses input image data 601 and smoothed image data 602.

The input image data 601 are new image data successively provided by the image record unit 1 with proper sample timing. The smoothed image data 602 are reference image data. In an initial step, image data firstly prepared by the image record unit 1 are the smoothed image data 602, i.e., first image data.

The input image data are second image data.

In step (1), the image record unit 1 prepares the first image data 602 at the first sampling timing and stores the same in a proper memory.

In step (2), the image record unit 1 prepares the second image data 601 at the second sampling timing and stores the same in a proper memory.

In step (3), the first and second image data 602 and 601 are compared with each other. If a difference between pixel values at the same coordinate position in the first and second image data 602 and 601 is within a preset range, the pixel value in the smoothed image, i.e., the first image 602 is unchanged, and the image data of the first image are provided as output image data 603.

If the difference between the pixel values at the same coordinate position in the first and second data 602 and 601 is out of the preset range, the pixel value of the first image data 602 is brought closer to the pixel value of the second image data 601 by a fixed value, to provide the output image data 603.

These processes are repeated to always update the smoothed image data, to provide an image having an afterimage.

In FIG. 22, a pixel value at a given address in the first image data 602 is i, and a pixel value at the same address in the second image data 601 is j.

If $j<i-\alpha$, the pixel value k at the address in the output image data 603 is changed to $k=i-\beta$.

If $i-\alpha<j<i+\alpha$, the pixel value k at the address in the output image data 603 is changed to $k=i$.

If $i+\alpha<j$, the pixel value k at the address in the output image data 603 is changed to $k=i+\beta$.

Here, the i, j, and k are pixel values at the same coordinates, and the $\alpha$ and $\beta$ are preset values with $\alpha>\beta$.

The image smoothing process according to the present invention clearly extracts a portion where a difference between pixel values of the first and second image data 602 and 601 is small, and if the difference is large, blurs and erases the corresponding portion. Namely, a portion that moves slowly or is stopped on the image is clearly extracted, and a portion that moves fast on the image is blurred and erased.

The shadows of surrounding objects move at high speed relative to the car itself, so that they are erased from the smoothed image.

Although traffic lines move at high speed similar to the shadows relative to the car itself, they are substantially immobile on the image so that they are extractable. Discontinuous traffic lines continuously flow at the same position on the image so that they are interpolated to provide continuous smooth images of lines.

A car running ahead moves slowly relative to the car itself, and therefore, it moves slowly on the image, so that it is extractable.

In this way, the smoothed image extraction unit 200 removes noise such as shadows from the road image, and the smoothed image is useful to easily recognize traffic lines and the car running ahead.

Figure 23:
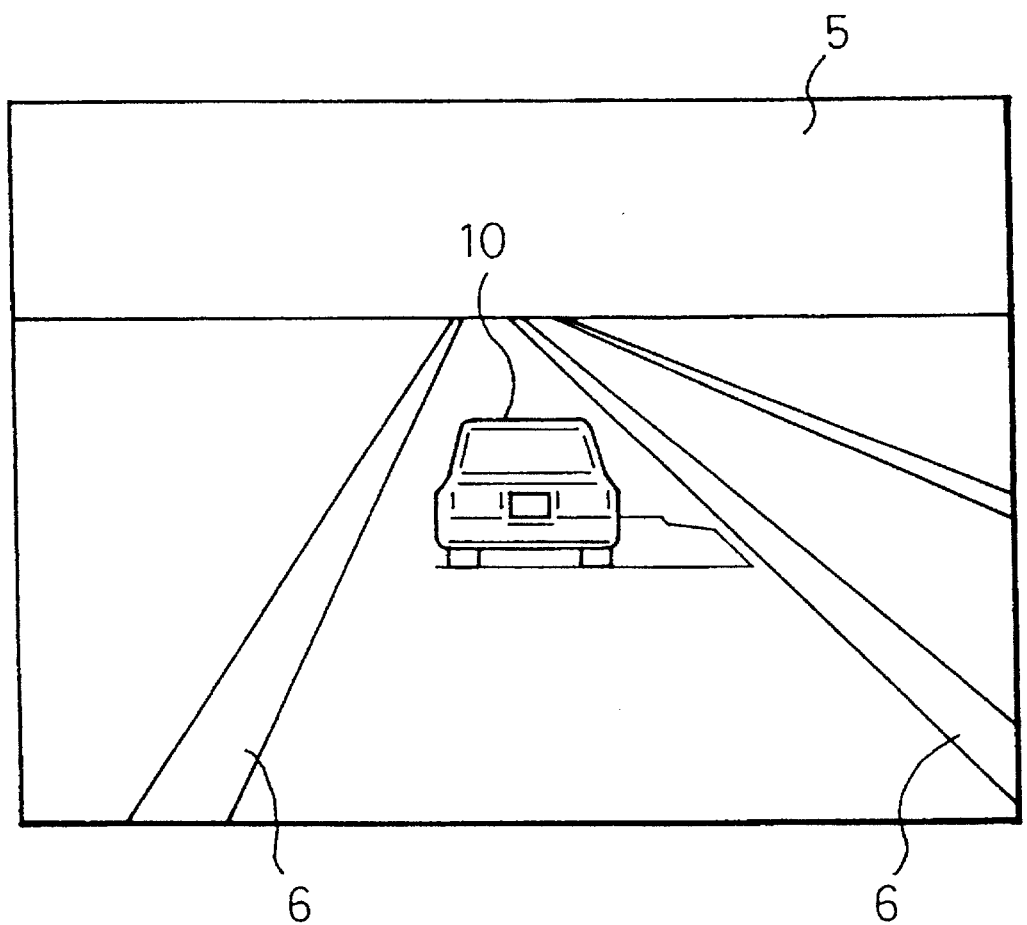
FIG. 23 shows a smoothed image provided by the smoothing process in the apparatus according to the third aspect of the present invention.

FIG. 23 shows the smoothed image with an afterimage effect provided by the smoothed image extraction unit 200.

In FIG. 23, noise such as shadows have been erased, discontinuous traffic lines have been interpolated into continuous lines, and the car running ahead has been extracted because it moves slowly relative to the car itself.

When a difference between pixel values at the same coordinate position in the first and second image data 602 and 601 is out of the set range, the smoothed image extraction unit 200 brings the pixel value of the smoothed image closer to the input image by the fixed value. Instead, the difference itself may be repeatedly reduced to provide the smoothed image.

Figure 24:
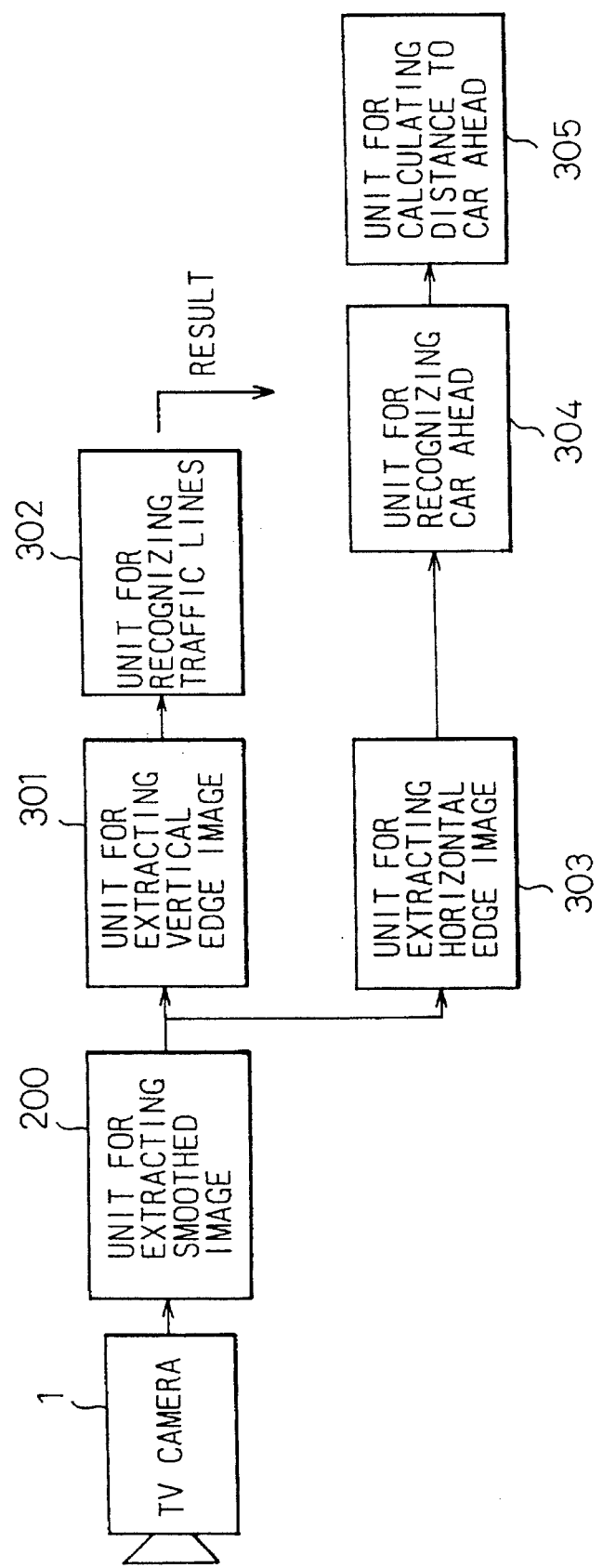
FIG. 24 is a block diagram showing another apparatus for recognizing road environment according to the third aspect of the present invention.

FIG. 24 is a block diagram showing an apparatus for recognizing road environment according to the present invention that simultaneously recognizes road conditions and a car running ahead.

Figure 31:
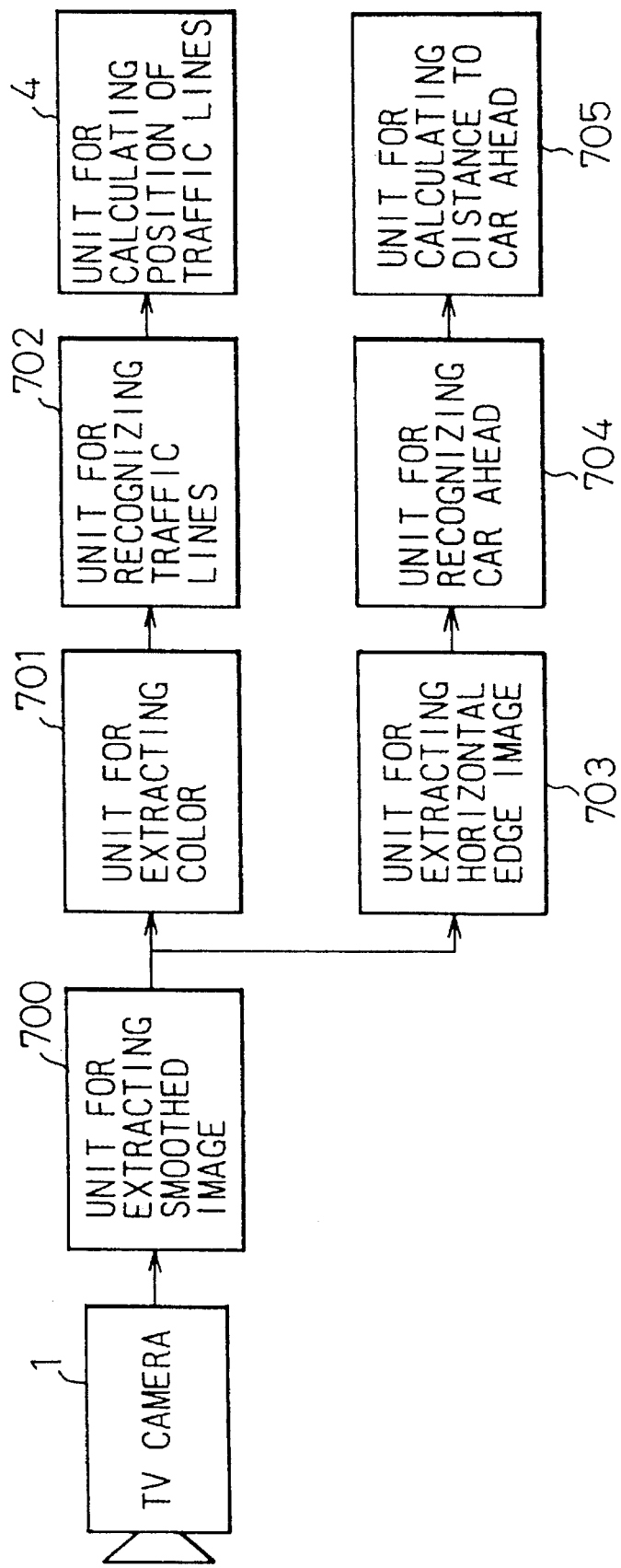
FIG. 31 is a block diagram showing a modification of the apparatus of FIG. 21 according to the present invention.

As shown in FIG. 31, a television camera 1 provides an image. A smoothed image extraction unit 700 removes noise such as shadows from the image and provides an image in which discontinuous traffic lines appear as continuous lines due to interpolation. A color extraction unit 701 extracts only white portions, for example. A traffic line recognition unit 702 determines the position of white traffic lines in a given lane. The traffic line recognizing process is the same as that explained with reference to FIG. 21.

A horizontal edge image extraction unit 703 extracts an image showing contours of a car running ahead according to the smoothed image. A car recognition unit 704 recognizes the car ahead in the lane determined by the traffic line recognition unit 702.

A distance calculation unit 705 calculates a distance to the car ahead. The process carried out by the unit 704 is the same as that of FIG. 21.

This embodiment specifies a lane at first, removes noise and surrounding objects out of the lane, and recognizes a car running ahead in the specified lane.

Figure 25:
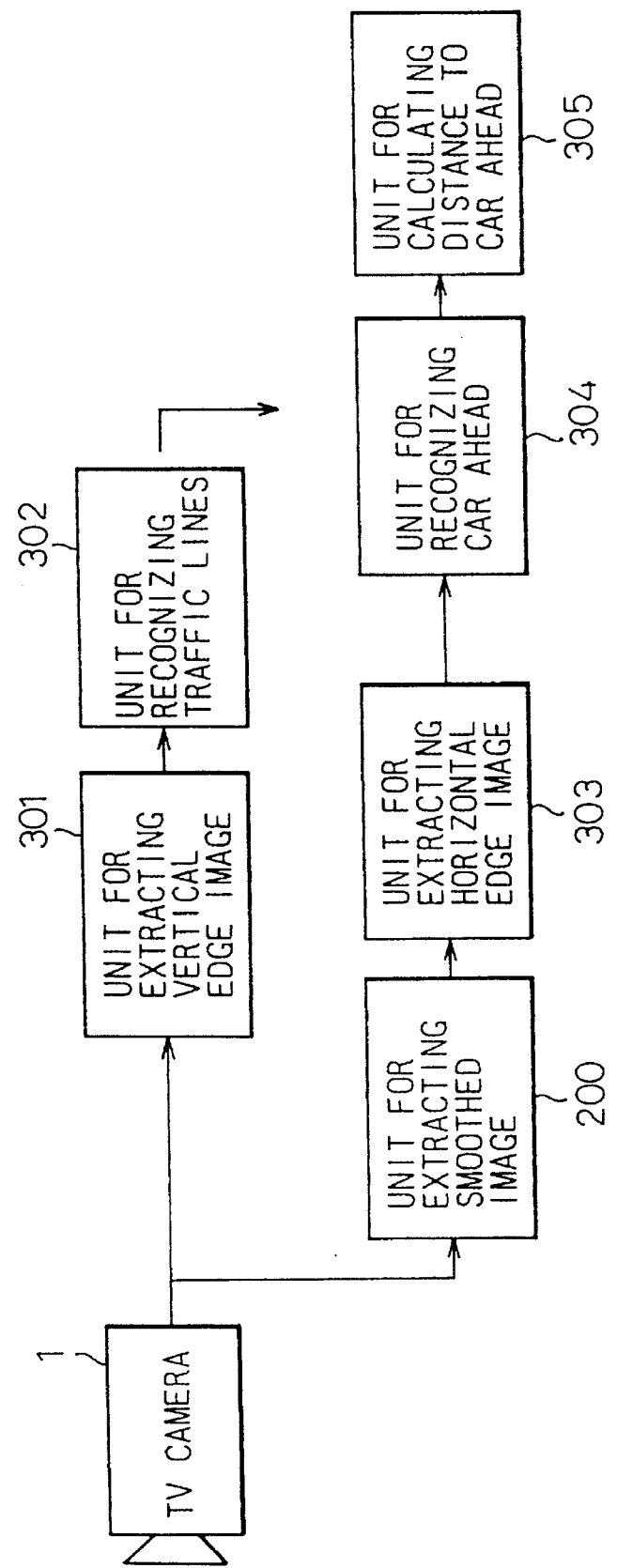
FIG. 25 is a block diagram showing still another apparatus for recognizing road environment according to the third aspect of the present invention.
Figure 26:
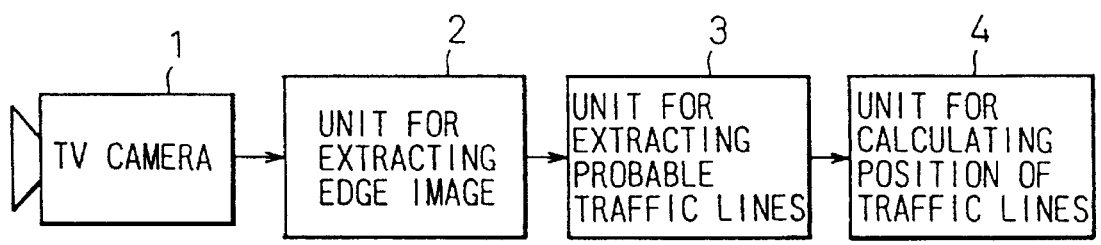
FIG. 26 is a block diagram showing a system for recognizing traffic lines in an apparatus for recognizing road environment according to a prior art.
Figure 27:
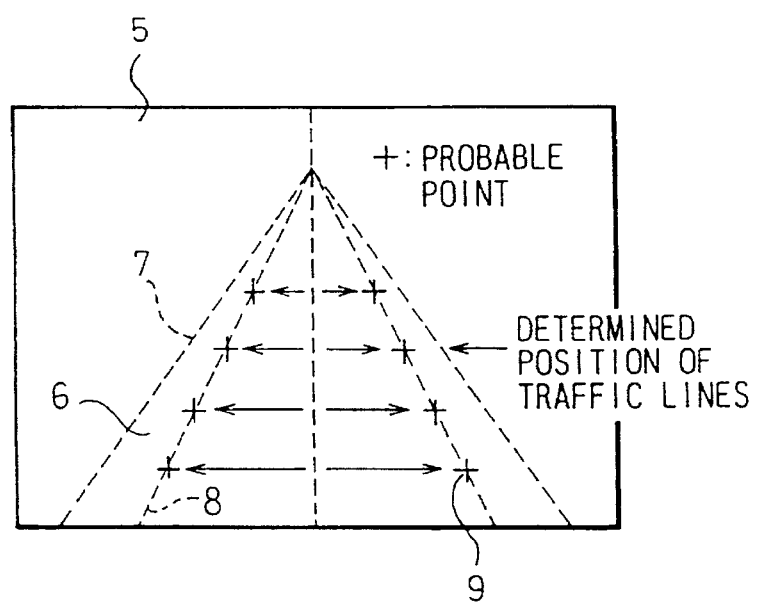
FIG. 27 explains a method of recognizing traffic lines painted on a road carried out by the apparatus of the prior art.
Figure 28:
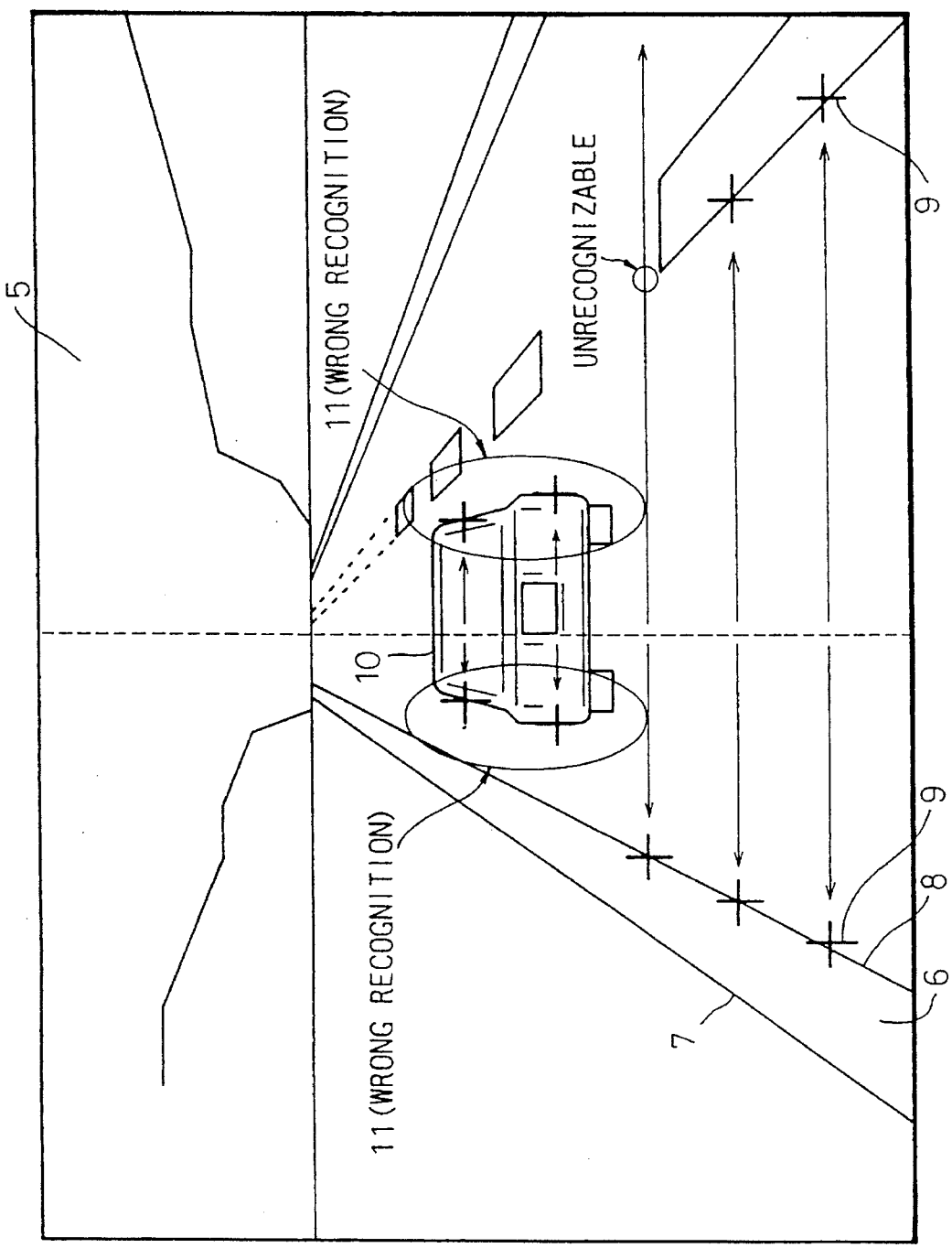
FIG. 28 shows traffic lines that are unrecognizable by the apparatus of the prior art.
Figure 29:
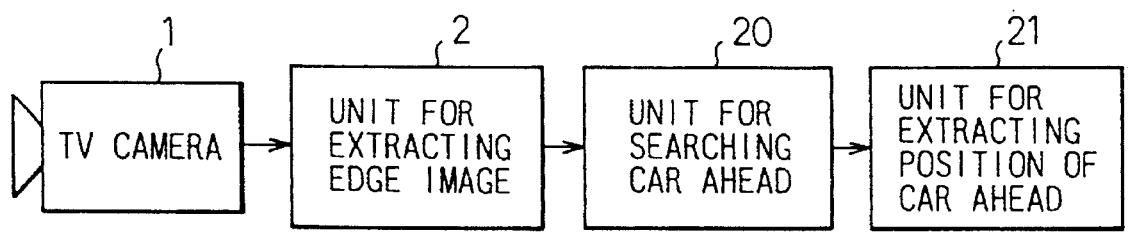
FIG. 29 is a block diagram showing a system for recognizing a car running ahead in an apparatus for recognizing road environment according to a prior art.
Figure 30:
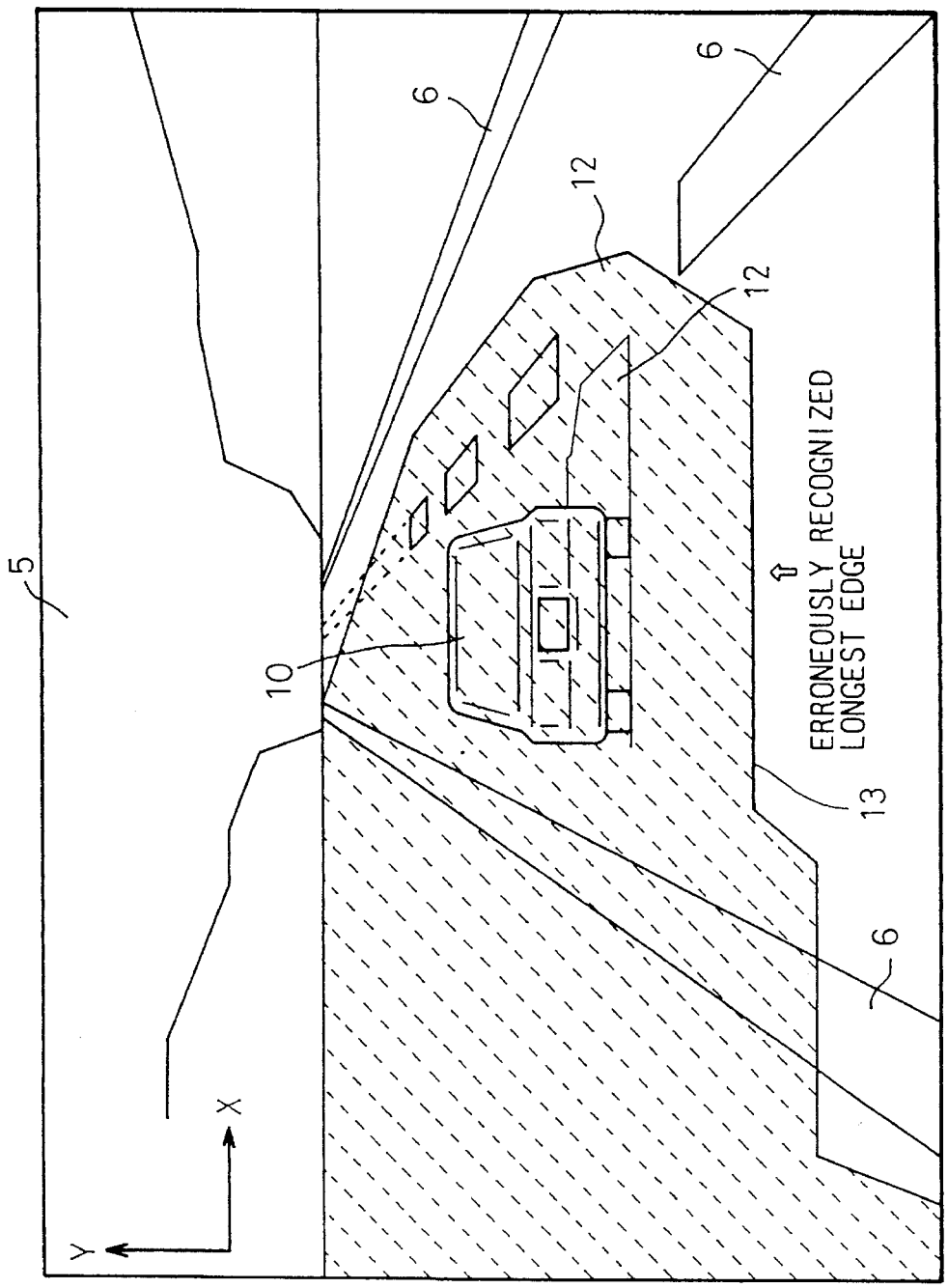
FIG. 30 explains a car running ahead misjudged by the apparatus of the prior art.

FIG. 25 shows a modification of the arrangement of FIG. 24. A television camera 1 provides an image. According to the image, a vertical edge image extraction unit 301 extracts an image showing contours of objects. A traffic line recognition unit 302 determines traffic lines in a specified lane. The traffic line recognition process is the same as that of the second aspect of the present invention.

A smoothed image extraction unit 200 removes noise such as shadows from the image provided by the television camera 1. A horizontal edge image extraction unit 303 provides an image showing contours of objects. A car recognition unit 304 recognizes a car ahead in the specified lane provided by the traffic line recognition unit 302. A distance calculation unit 305 calculates a distance to the car ahead. The process carried out by the unit 304 is the same as that of FIG. 21.

Similar to the previous embodiment, this embodiment specified a lane, removes noise such as surrounding objects from the lane, and accurately recognizes a car running ahead in the specified lane.

Figure 32:
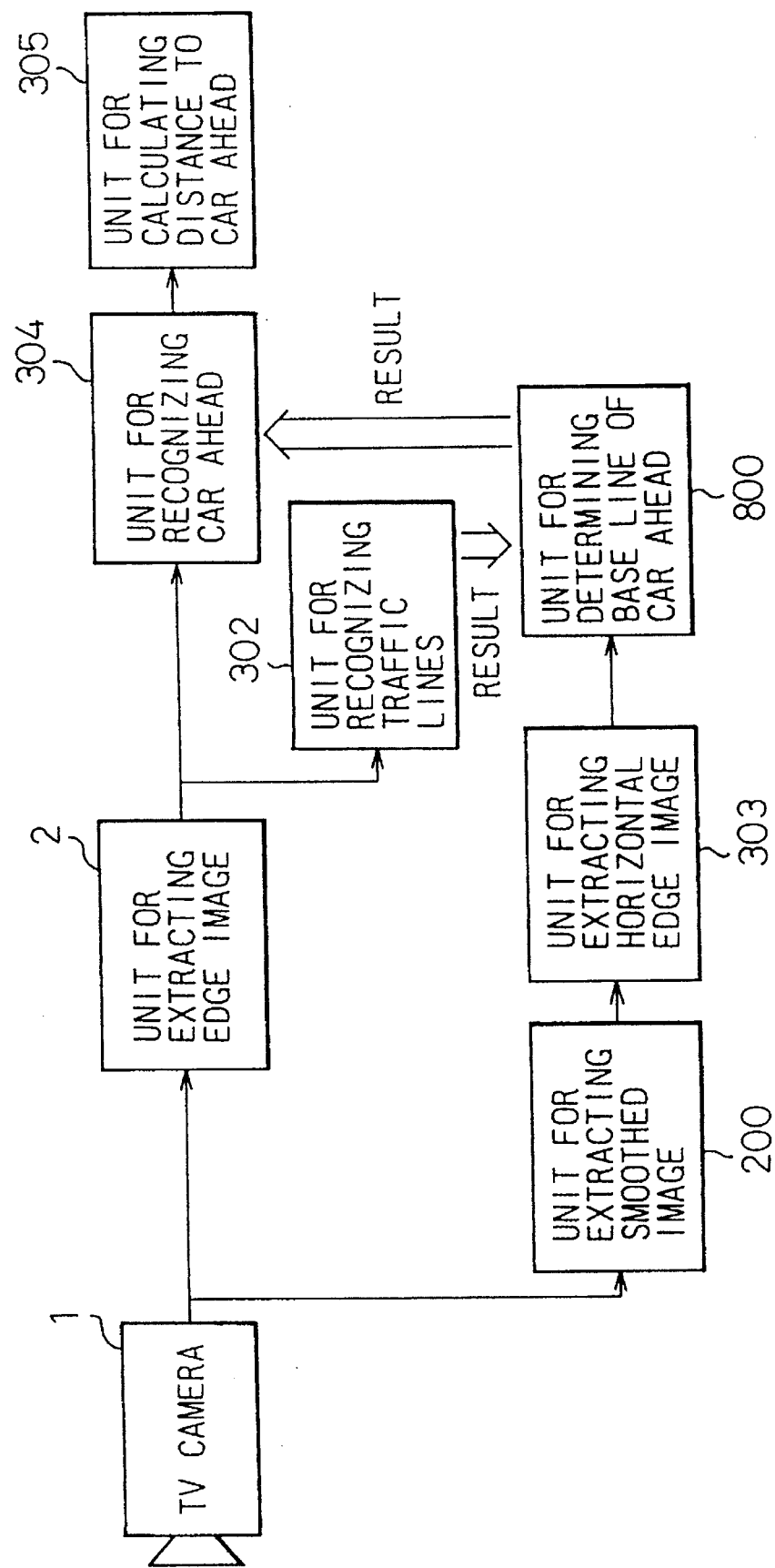
FIG. 32 is a block diagram showing another modification of the apparatus of FIG. 21 according to the present invention.

FIG. 32 shows a modification of FIG. 25. A television camera 1 provides an image. An edge image extraction unit 2 provides an image showing only contours of objects. A traffic line recognition unit 302 determines traffic lines in a specified lane. The traffic line recognition process is the same as that of the second aspect of the present invention.

A smoothed image extraction unit 200 removes noise such as shadows from the image provided by the television camera 1 and provides a smoothed image. A horizontal edge image extraction unit 303 provides an image showing only contours of objects according to the smoothed image. A base line decision unit 800 determines a base line of a car running ahead in the specified lane provided by the traffic line recognition unit 302. The process carried out by the base line decision unit 800 is the same as that carried out by the base line decision unit 31 of the first aspect of the present invention.

According to the base line of the car ahead, a car recognition unit 304 determines the position of the car ahead in the image provided by the edge image extraction unit 2. A distance extraction unit 305 calculates a distance to the car ahead. The process carried out by the unit 304 is the same as that of FIG. 21.

Similar to the previous embodiment, this embodiment specifies a lane, removes noise such as surrounding objects from the lane, and accurately recognizes a car running ahead in the specified lane.

In the above embodiments, the television camera is set such that the top end of an image picked up by the camera forms a distal end. This arrangement does not limit the present invention. The television camera may be optionally set.

As explained above, the present invention easily and correctly recognizes the position of white, yellow, or discontinuous traffic lines and the position of a car running ahead according to an input image picked up by an image record unit such as a television camera mounted on a car even if the image involves noise such as shadows. The present invention, therefore, provides many pieces of correct information useful for safe driving.

We claim:

1. An apparatus for recognizing road environment, comprising:

road image recording means mounted on a car to pick up an image of a road;

edge imaging means for preparing an edge image showing contours of objects within said road image;

base line decision means for detecting probable base lines having long horizontal edges in the edge image by moving a search line in a predetermined range and for selecting one of the probable base lines as a baseline of a car running ahead, which baseline is a boundary between said car running ahead and the road, according to an arrangement of the detected horizontal edges, said base line decision means moving the search line at a predetermined sampling interval from a proximal end toward a distal end in the edge image, and determining the search lines containing at least a predetermined number of pixels, each pixel containing a horizontal edge component, as probable base lines by detecting pixel values along the search line;

search area decision means for determining horizontal positions of left and right edges of the base line and setting a search area including the base line and the horizontal positions of left and right edges of the base line; and ahead car position determining means for determining a position in said search area of the car running ahead, the ahead car position determining means determining the horizontal positions of the car ahead based upon said horizontal edge components in the search area wherein said pixels are counted by count means.

2. The apparatus according to claim 1, wherein the search area has predetermined height and width and a lower edge of the search area coincides with the base line.

3. The apparatus according to claim 2, wherein the position determining means determines the position of the car ahead according to a distribution of horizontal edges found in the search area.

4. The apparatus according to claim 3, wherein the position determining means determines the position of the car ahead according to vertical projection values of pixels that exist along the horizontal edges found in the search area and respectively contain horizontal edge components.

5. The apparatus according to claim 3, wherein the means for determining a position of the car running ahead prepares a recognition frame of predetermined size in the search area, moves the recognition frame in the search area, and determines a position where the recognition frame involves the largest number of pixels each containing a horizontal edge component as the position of the car running ahead.

6. The apparatus according to claim 5, wherein the sizes of the search area and the recognition frame are determined according to setting conditions of the road image record means such that the scaling of an actual object corresponding to the search area is constant.

7. The apparatus according to claim 3, wherein the means for determining a position of the car running ahead prepares a recognition frame of predetermined size in the search area, moves the recognition frame in the search area, and determines a position where the recognition frame shows the highest symmetry along a vertical center line thereof as the position of the car running ahead.

8. The apparatus according to claim 3, wherein the means for determining a position of the car running ahead prepares a recognition frame of predetermined size in the search area, moves the recognition frame in the search area, detects at each position the number of pixels each containing a horizontal edge component as well as the symmetry of the recognition frame along a vertical center line thereof, provides as evaluation value of the recognition frame at each position according to the symmetry, and determines a position that provides the highest evaluation value as the position of the car running ahead.

9. The apparatus according to claim 1, further comprising means for calculating a distance to the car ahead according to the base line of the car ahead.

10. The apparatus according to claim 1, further comprising means for recognizing traffic lines for defining lanes and searching the position of the car running ahead in the lanes.

11. An apparatus for recognizing road environment, comprising:

road image recording means mounted on a car to pick up an image of a road;

edge imaging means for preparing an edge image showing contours of objects within said road image;

base line decision means for detecting probable base lines having long horizontal edges in the edge image by moving a search line in a predetermined range and for selecting one of the probable base lines as a baseline of a car running ahead, which baseline is a boundary between said car running ahead and the road, according to an arrangement of the detected horizontal edges, said base line decision means moving the search line at a predetermined sampling interval from a proximal end toward a distal end in the edge image, and determining the search lines containing at least a predetermined number of pixels, each pixel containing a horizontal edge component, as probable base lines by detecting pixel values along the search line, said base line decision means determining that a car running ahead exists when a plurality of probable base lines exist and selecting the lowest probable base line in said road image as the base line of the car running ahead;

search area decision means for determining horizontal positions of left and right edges of the base line and for setting a search area according to the base line and the horizontal positions of left and right edges of the base line; and position determining means for determining a position of the car running ahead, the ahead car position determining means determining the horizontal positions of the car ahead based upon said horizontal edge components in the search area counted by count means.

12. An apparatus for recognizing road environment, comprising:

road image recording means mounted on a car to pick up an image of a road;

edge imaging means for preparing an edge image showing contours of objects according to the road image;

proximal line recognition means for recognizing traffic lines in a proximal part of said edge image; and distal line recognition means for recognizing traffic lines in a distal part of the edge image, wherein the proximal line recognition means halves the proximal part of the edge image into a proximal left area and a proximal right area, leftwardly searches the proximal left area for probable points to determine as edge points of a left traffic line, rightwardly searches the proximal right area for probable points to determine as edge points of a right traffic line, recognizes traffic lines according to the probable points, and the distal line recognition means tracing the traffic lines recognized by the proximal line recognition means in a direction extended into the distal part, and completely constructs the traffic lines.

13. The apparatus according to claim 12, wherein proximal line recognition means horizontally scans pixels with a spatial filter in the road image to obtain absolute values of the pixels, determines any pixels whose absolute values exceed a predetermined threshold as edge points, and prepares a traffic line image in which the edge points are connected to form a traffic line.

14. The apparatus according to claim 12, wherein the traffic line image is formed of positive edges including pixels each having a positive value and an absolute value greater than the threshold, and negative edges including pixels each having a negative value and an absolute value greater than the threshold.

15. The apparatus according to claim 14, wherein the proximal line recognition means recognizes pairs of positive and negative neighboring edges, whose distances apart are within a predetermined range corresponding to a traffic line width as probable points.

16. The apparatus according to claim 15, wherein the proximal line recognition means recognizes pairs of edges whose distances apart are within a predetermined range corresponding to a lane width.

17. The apparatus according to claim 16, wherein the proximal line recognition means determines whether or not recognized lines are narrow traffic lines or wide traffic lines, and recognizes points interpolated from the wide traffic lines at a predetermined interval as probable points.

18. The apparatus according to claim 16, wherein the proximal line recognition means recognizes lines connected with probable points included in a group of pairs of edges whose distances apart are within the predetermined range as traffic lines when a number of the probable points included in the group exceeds a preset value.

19. The apparatus according to claim 18, wherein the proximal line recognition means recognizes the traffic lines by interpolating the lines connected with the probable points included in the groups when a number of groups exists.

20. The apparatus according to claim 15, wherein the proximal line recognition means divides the probable points into groups in which horizontal differences between longitudinally neighboring probable points are less than a predetermined threshold and horizontal distances between horizontally neighboring probable points are within a predetermined range, and recognizes lines connected with the probable points in respective groups as traffic lines when a number of the probable points included in these groups exceeds a preset value.

21. The apparatus according to claim 20, wherein the proximal line recognition means recognizes a group including the largest number of the probable points as the traffic line when a number of the groups exists.

22. The apparatus according to claim 15, wherein the traffic line is white.

23. The apparatus according to claim 12, wherein when no traffic line is determined in one of the proximal left or right area, the proximal line recognition means estimates points in the area with no traffic line at positions spaced apart from the traffic line determined in the other proximal area by a predetermined lane width and recognizes lines connected with the probable points estimated as the traffic line.

24. The apparatus according to claim 12, wherein the proximal line recognition means defines a horizontal line nearest to the image recording means as a nearest line, and when any one of traffic lines determined in the proximal left and right areas has no common point on the nearest line, extends the traffic line up to the nearest line.

25. The apparatus according to claim 12, wherein when the traffic lines are discontinuous in the distal area, the distal line recognition means traces the traffic lines for a predetermined interval beyond the discontinuous parts, and continues the tracing by interpolating the discontinuous parts when the traffic lines exist beyond the discontinuous parts.

26. The apparatus according to claim 12, further comprising traffic line position calculating means for calculating positions of traffic lines, the traffic line position calculating means calculates widths on the image corresponding to widths of the traffic lines and lanes according to the setting conditions of the record image recording means and actual widths of the traffic lines and lanes, and confirms the positions of the traffic lines according to the calculated widths.

27. An apparatus for recognizing road environment, comprising:

road image recording means mounted on a car to pick up an image of a road;

image smoothing means which obtains a first road image through the road image recording means, obtains a second road image through the road image recording means, compares the first and second road images with each other, leaves the first road image as it is when a difference between pixel values at the same coordinate position in the first and second road images is within a preset range, updates the pixel value of the first road image by bringing the pixel value of the first road image closer to the pixel value of the second road image by a preset value when the difference is out of the preset range, and repeats the updating process to form a smoothed image;

edge imaging means for preparing an edge image showing contours of objects in the road image; and base line decision means for detecting horizontal edges in the edge image by moving a search line and determining a base line of a car running ahead, said base line being a boundary between a car running ahead and the road, according to an arrangement of the detected horizontal edges.

28. The apparatus according to claim 27, wherein the image smoothing means brings the pixel value of the first road image closer to the pixel value of the second road image by a value based on the difference between the pixel values of the first and second road images when the difference is outside the preset range.

* * * * *

UNITED STATES PATENT AND TRADEMARK OFFICE
CERTIFICATE OF CORRECTION

PATENT NO. : 5,555,312
DATED : Sep. 10, 1996
INVENTOR(S) : SHIMA et al.

It is certified that error appears in the above-identified patent and that said Letters Patent is hereby corrected as shown below:

On the title page, item [73] should be corrected to read as follows:

Assignment:    Fujitsu Limited, Kanagawa, Japan
                            Fujitsu Ten Limited, Hyogo, Japan Signed and Sealed this Twenty-eighth Day of March, 2000

Attest:

Q. TODD DICKINSON

*Attesting Officer*    *Commissioner of Patents and Trademarks*